United States Patent
Takahashi et al.

(10) Patent No.: US 11,921,954 B2
(45) Date of Patent: Mar. 5, 2024

(54) ELECTRONIC APPARATUS, IMAGING APPARATUS, OPERATION METHOD OF ELECTRONIC APPARATUS, AND OPERATION METHOD OF IMAGING APPARATUS

(71) Applicant: FUJIFILM Corporation, Tokyo (JP)

(72) Inventors: Kosuke Takahashi, Saitama (JP); Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/699,824

(22) Filed: Mar. 21, 2022

(65) Prior Publication Data

US 2022/0206666 A1 Jun. 30, 2022

Related U.S. Application Data

(63) Continuation of application No. PCT/JP2020/033740, filed on Sep. 7, 2020.

(30) Foreign Application Priority Data

Oct. 21, 2019 (JP) ................................. 2019-192106

(51) Int. Cl.
*G06F 3/041* (2006.01)
*G01V 3/08* (2006.01)
(Continued)

(52) U.S. Cl.
CPC .......... *G06F 3/04186* (2019.05); *G01V 3/081* (2013.01); *G03B 17/14* (2013.01); *G06F 1/1637* (2013.01); *H04N 23/531* (2023.01)

(58) Field of Classification Search
CPC .. G06F 3/03547; G06F 3/044; G06F 3/04883; G06F 2203/0339;
(Continued)

(56) References Cited

U.S. PATENT DOCUMENTS 10,582,096 B2 * 3/2020 Misawa ................. H04N 23/60
2011/0249165 A1 10/2011 Churei
(Continued)

FOREIGN PATENT DOCUMENTS

CN 102215344 A 10/2011
JP 2012-118588 A 6/2012
(Continued)

OTHER PUBLICATIONS

English Translation of JP 2018182437 A (Year: 2018).*
(Continued)

*Primary Examiner* — Nelson M Rosario
(74) *Attorney, Agent, or Firm* — Studebaker & Brackett PC

(57) ABSTRACT

An electronic apparatus and an operation method of an electronic apparatus that can avoid erroneous detection of a touch panel in a case where a touch panel display unit is closed with respect to a specific surface are provided. An electronic apparatus includes a touch panel display unit that includes a touch panel and is opened and closed with respect to a specific surface of an electronic apparatus main body by rotating in a direction of separating the touch panel from the specific surface and a direction of bringing the touch panel close to the specific surface, and restricts a sensitivity of the touch panel in a case where the touch panel display unit is positioned in the range on the side opposite to the specific surface with respect to the first position in a rotation range of the touch panel display unit.

17 Claims, 23 Drawing Sheets

(51) Int. Cl.
*G03B 17/14* (2021.01)
*G06F 1/16* (2006.01)
*H04N 23/53* (2023.01)

(58) Field of Classification Search
CPC ........ G06F 2203/04809; G06F 1/1601; G06F 1/1677; G06F 1/3262; G06F 1/3265; G06F 3/0418; G06F 1/1681; G06F 2203/04108; G06F 1/1637; G06F 1/3287; G06F 3/04186; H04N 23/50; H04N 23/51; H04N 23/62; H04N 23/63; H04N 23/53; H04N 23/631; H04N 23/632; H04N 23/667; H04N 23/00; H04N 23/531; H04N 23/60; H04N 23/675; Y02D 10/00; G01V 3/081; G03B 17/02; G03B 17/04; G03B 17/14; G03B 17/18
See application file for complete search history.

(56) References Cited

U.S. PATENT DOCUMENTS

| | | |
|---|---|---|
| 2012/0134642 A1 | 5/2012 | Okamura |
| 2018/0213157 A1 | 7/2018 | Suzuki |
| 2019/0073086 A1 | 3/2019 | Ishimaru |

FOREIGN PATENT DOCUMENTS

| | | | |
|---|---|---|---|
| JP | 2014-067316 A | | 4/2014 |
| JP | 2014-206626 A | | 10/2014 |
| JP | 2017-151587 A | | 8/2017 |
| JP | 2018182437 A | * | 11/2018 |
| JP | 2019-046146 A | | 3/2019 |
| JP | 6501807 B2 | | 4/2019 |
| WO | 2014/091797 A1 | | 6/2014 |

OTHER PUBLICATIONS

An Office Action; "Notice of Reasons for Refusal," mailed by the Japanese Patent Office dated Mar. 7, 2023, which corresponds to Japanese Patent Application No. 2021-554137 and is related to U.S. Appl. No. 17/699,824; with English language translation.

International Search Report issued in PCT/JP2020/033740; dated Nov. 24, 2020.

International Preliminary Report on Patentability issued in PCT/JP2020/033740; completed Nov. 4, 2021.

Office Action mailed by China National Intellectual Property Administration dated Dec. 1, 2023, which corresponds to Chinese Patent Application No. 202080072196.9 and is related to U.S. Appl. No. 17/699,824; with English language translation.

* cited by examiner

ELECTRONIC APPARATUS, IMAGING APPARATUS, OPERATION METHOD OF ELECTRONIC APPARATUS, AND OPERATION METHOD OF IMAGING APPARATUS

This application is a Continuation of PCT International Application No. PCT/JP2020/033740 filed on Sep. 7, 2020, which claims priority under 35 U.S.C § 119(a) to Japanese Patent Application No. 2019-192106 filed on Oct. 21, 2019. Each of the above application(s) is hereby expressly incorporated by reference, in its entirety, into the present application.

BACKGROUND OF THE INVENTION

1. Field of the Invention

The technology of the present disclosure relates to an electronic apparatus, an imaging apparatus, an operation method of an electronic apparatus, and an operation method of an imaging apparatus.

2. Description of the Related Art

JP6501807B discloses an electronic apparatus in which a display unit is supported by an apparatus main body in an openable and closable manner through an opening and closing axis and a rotatable manner through a rotation axis in an opened state.

The electronic apparatus disclosed in JP6501807B comprises a magnetic field generation unit, an opening and closing detection unit used for detecting opening and closing of the display unit, a rotation detection unit used for detecting rotation of the display unit, and a control unit that controls display on a display surface of the display unit based on a detection result of a magnetic field of the magnetic field generation unit by the opening and closing detection unit and the rotation detection unit.

At a position at which the display unit is closed with respect to the apparatus main body in a state where the display surface faces toward a rear surface side of the apparatus main body, the opening and closing detection unit and the rotation detection unit detect the magnetic field of the magnetic field generation unit. In addition, the opening and closing detection unit, the rotation detection unit, and the magnetic field generation unit are arranged such that in a case where the display unit is opened to a predetermined angle from the closed position with respect to the apparatus main body, only the rotation detection unit detects the magnetic field of the magnetic field generation unit, and in a case where the display unit is rotated in a direction in which the display surface faces toward the rear surface side of the apparatus main body by greater than the predetermined angle, the opening and closing detection unit and the rotation detection unit do not detect the magnetic field of the magnetic field generation unit.

In a state where the display surface faces toward a front surface side of the apparatus main body in the opened state of the display unit, the magnetic field generation unit is arranged close to the opening and closing axis on an upper side of the rotation axis and to have a magnetization direction in a direction parallel to the opening and closing axis with the S pole on an upper side of the apparatus main body. The rotation detection unit is arranged such that a magnetic field detection direction and a direction of the magnetic field of the magnetic field generation unit are the same direction. The opening and closing detection unit is arranged such that the magnetic field detection direction and the direction of the magnetic field of the magnetic field generation unit are opposite directions.

SUMMARY OF THE INVENTION

One embodiment according to the technology of the present disclosure provides an electronic apparatus, an imaging apparatus, an operation method of an electronic apparatus, and an operation method of an imaging apparatus that can avoid erroneous detection of a touch panel in a case where a touch panel display unit is closed with respect to a specific surface.

A first aspect according to the technology of the present disclosure is an electronic apparatus comprising a touch panel display unit that includes a touch panel of at least one type of a capacitance type or an electromagnetic induction type and is opened and closed with respect to a specific surface of an electronic apparatus main body by rotating in a direction of separating the touch panel from the specific surface and a direction of bringing the touch panel close to the specific surface, and a restriction portion that restricts a sensitivity of the touch panel in a case where the touch panel display unit is positioned within a closed range of from a first position to a second position on a specific surface side of the first position in a rotation range of the touch panel display unit.

A second aspect according to the technology of the present disclosure is an imaging apparatus comprising a touch panel display unit that includes a touch panel of at least one type of a capacitance type or an electromagnetic induction type and is opened and closed with respect to a specific surface of an imaging apparatus main body by rotating in a direction of separating the touch panel from the specific surface and a direction of bringing the touch panel close to the specific surface, and a restriction portion that restricts a sensitivity of the touch panel in a case where the touch panel display unit is positioned within a closed range of from a first position to a second position on a specific surface side of the first position in a rotation range of the touch panel display unit.

A third aspect according to the technology of the present disclosure is the imaging apparatus according to the second aspect, in which the restriction portion restricts the sensitivity in a case where the touch panel display unit is positioned within the closed range in accordance with an operation of rotating in a direction of closing the touch panel display unit with respect to the specific surface.

A fourth aspect according to the technology of the present disclosure is the imaging apparatus according to the third aspect, further comprising a control portion that performs a control for making at least a power supply of the touch panel in the touch panel display unit OFF after the sensitivity is decreased below a predetermined sensitivity by the restriction portion at the first position in a course of closing of the touch panel display unit with respect to the specific surface in accordance with the operation of rotating in the direction of closing the touch panel display unit with respect to the specific surface.

A fifth aspect according to the technology of the present disclosure is the imaging apparatus according to any one of the second to fourth aspects, in which the first position is a position predetermined as a position at which the touch panel performs erroneous detection due to electrical characteristics of a component of the imaging apparatus main body.

A sixth aspect according to the technology of the present disclosure is the imaging apparatus according to any one of the second to fifth aspects, further comprising a sensor that contactlessly detects positioning of the touch panel display unit within the closed range, in which the restriction portion restricts the sensitivity in a case where positioning of the touch panel display unit within the closed range is detected by the sensor.

A seventh aspect according to the technology of the present disclosure is the imaging apparatus according to the sixth aspect, in which the sensor includes a magnet and a hall element, one of the hall element and the magnet is disposed in the touch panel display unit, and the other is disposed in the imaging apparatus main body, and in a case where the touch panel display unit is positioned within the closed range, the hall element detects a magnetic field of the magnet with a predetermined intensity or more.

An eighth aspect according to the technology of the present disclosure is the imaging apparatus according to any one of the second to seventh aspects, in which the specific surface is a rear surface of the imaging apparatus main body, and the touch panel display unit is pivotally supported by the imaging apparatus main body through a hinge, and the touch panel is opened and closed with respect to the rear surface by rotating in a direction of separating the touch panel from the rear surface and a direction of bringing the touch panel close to the rear surface through the hinge.

A ninth aspect according to the technology of the present disclosure is the imaging apparatus according to the eighth aspect, in which the hinge is arranged at a position at which the touch panel display unit is rotatable from one of the rear surface side and a bottom surface side of the imaging apparatus main body toward the other.

A tenth aspect according to the technology of the present disclosure is the imaging apparatus according to any one of the second to ninth aspects, in which the restriction portion includes a blocking circuit that blocks output of a detection indicative signal indicating that detection is performed by the touch panel, and restricts the sensitivity by causing the blocking circuit to block the output in a case where the touch panel display unit is positioned within the closed range.

An eleventh aspect according to the technology of the present disclosure is the imaging apparatus according to the tenth aspect, in which the blocking circuit includes a logic circuit that outputs the detection indicative signal in a case where the touch panel display unit is positioned within an opened range which is a region separated from the specific surface further than the first position in the rotation range.

A twelfth aspect according to the technology of the present disclosure is the imaging apparatus according to the eleventh aspect, in which the logic circuit includes a first input terminal into which a detection indication signal indicating whether or not detection is performed by the touch panel is input, and a second input terminal into which an opening and closing signal indicating in which of the closed range and the opened range the touch panel display unit is positioned is input, and outputs a logical product of the detection indication signal input into the first input terminal and the opening and closing signal input into the second input terminal.

A thirteenth aspect according to the technology of the present disclosure is the imaging apparatus according to the tenth aspect, in which the touch panel includes an output terminal from which the detection indicative signal is output to an output destination, the blocking circuit includes a switching element capable of switching between a connection state where the output terminal and the output destination are connected, and a disconnection state where the output terminal and the output destination are disconnected, and a supply circuit that supplies an opening and closing signal indicating in which of an opened range which is a range separated from the specific surface further than the first position in the rotation range, and the closed range the touch panel display unit is positioned to the switching element, and the switching element is set to the connection state in a case where the opening and closing signal supplied from the supply circuit indicates that the touch panel display unit is positioned within the opened range, and is set to the disconnection state in a case where the opening and closing signal supplied from the supply circuit indicates that the touch panel display unit is positioned within the closed range.

A fourteenth aspect according to the technology of the present disclosure is an operation method of an electronic apparatus including a touch panel display unit that includes a touch panel of at least one type of a capacitance type or an electromagnetic induction type and is opened and closed with respect to a specific surface of an electronic apparatus main body by rotating in a direction of separating the touch panel from the specific surface and a direction of bringing the touch panel close to the specific surface, the operation method comprising restricting a sensitivity of the touch panel in a case where the touch panel display unit is positioned within a closed range of from a first position to a second position on a specific surface side of the first position in a rotation range of the touch panel display unit.

A fifteenth aspect according to the technology of the present disclosure is an operation method of an imaging apparatus including a touch panel display unit that includes a touch panel of at least one type of a capacitance type or an electromagnetic induction type and is opened and closed with respect to a specific surface of an imaging apparatus main body by rotating in a direction of separating the touch panel from the specific surface and a direction of bringing the touch panel close to the specific surface, the operation method comprising restricting a sensitivity of the touch panel in a case where the touch panel display unit is positioned within a closed range of from a first position to a second position on a specific surface side of the first position in a rotation range of the touch panel display unit.

DESCRIPTION OF THE PREFERRED EMBODIMENTS

Hereinafter, an example of an embodiment of an imaging apparatus according to the embodiment of the technology of the present disclosure will be described in accordance with the appended drawings.

First, words used in the following description will be described.

The abbreviation CPU stands for "Central Processing Unit". The abbreviation RAM stands for "Random Access Memory". The abbreviation ASIC stands for "Application Specific Integrated Circuit". The abbreviation PLD stands for "Programmable Logic Device". The abbreviation FPGA stands for "Field-Programmable Gate Array". The abbreviation SoC stands for "System-on-a-chip". The abbreviation SiP stands for "System-in-a-package". The abbreviation SSD stands for "Solid State Drive". The abbreviation USB stands for "Universal Serial Bus". The abbreviation HDD stands for "Hard Disk Drive". The abbreviation EEPROM stands for "Electrically Erasable and Programmable Read Only Memory". The abbreviation EL stands for "Electro-Luminescence". The abbreviation A/D stands for "Analog/Digital". The abbreviation I/F stands for "Interface". The abbreviation UI stands for "User Interface".

In the description of the present specification, "horizontal" refers to being horizontal in a sense of not only being completely horizontal but also including an error generally allowed in the technical field to which the technology of the present disclosure belongs. In the description of the present specification, "parallel" refers to being parallel in a sense of not only being completely parallel but also including an error generally allowed in the technical field to which the technology of the present disclosure belongs. In the description of the present specification, "vertical" refers to being vertical in a sense of not only being completely vertical but also including an error generally allowed in the technical field to which the technology of the present disclosure belongs. In the description of the present specification, "same" refers to being the same in a sense of not only being completely the same but also including an error generally allowed in the technical field to which the technology of the present disclosure belongs. In the description of the present specification, "in plane" refers to being in plane in a sense of not only being completely in plane but also including an error generally allowed in the technical field to which the technology of the present disclosure belongs.

Figure 1:
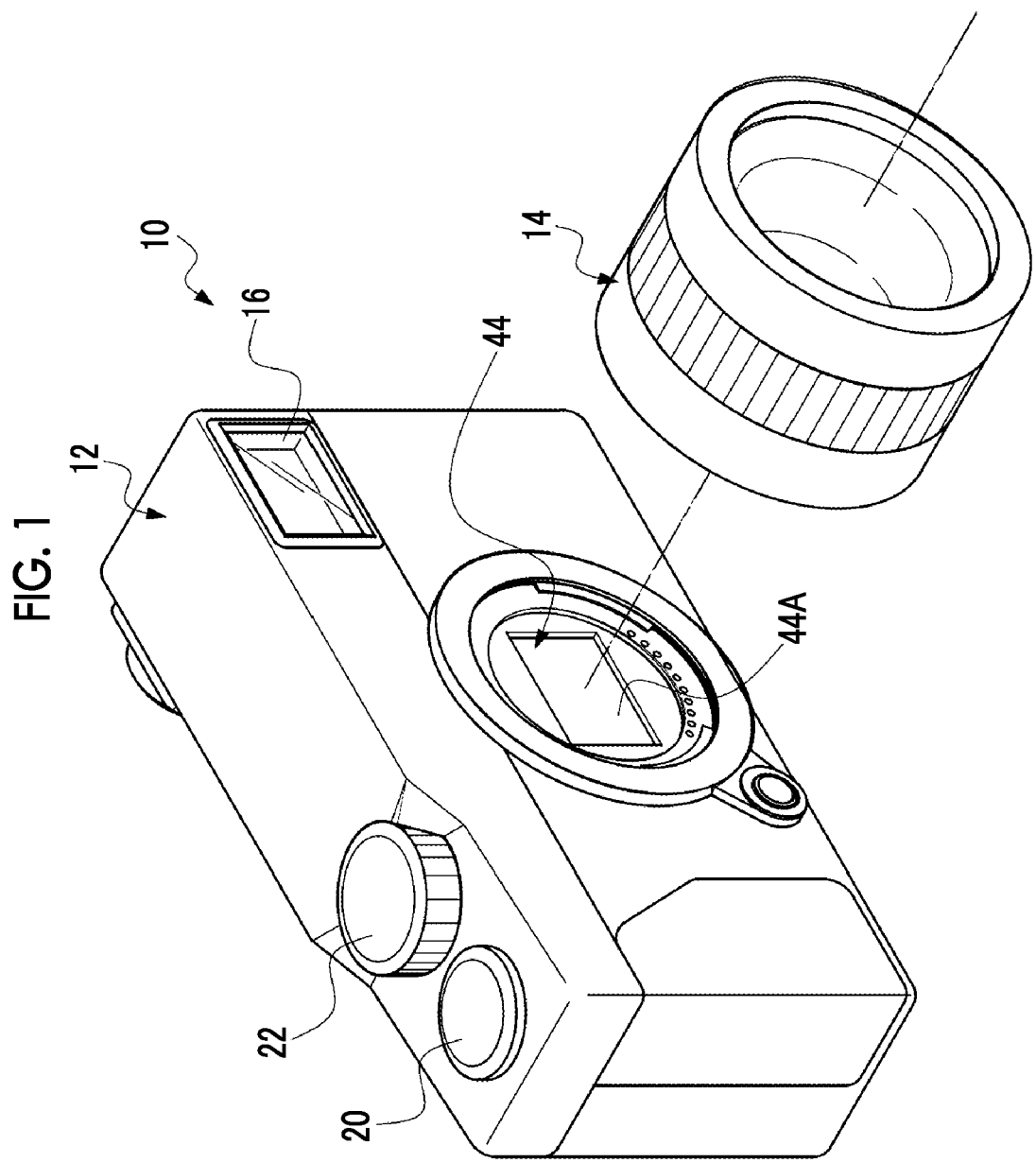
FIG. 1 is a perspective front view illustrating an example of an exterior on a front surface side of an imaging apparatus according to an embodiment.

As illustrated in FIG. 1 as an example, an imaging apparatus 10 is a lens-interchangeable digital camera. The imaging apparatus 10 comprises an imaging apparatus main body 12 and an interchangeable lens 14 that is interchangeably mounted on the imaging apparatus main body 12. Here, while the lens-interchangeable digital camera is exemplified as an example of the imaging apparatus 10, the technology of the present disclosure is not limited thereto. The imaging apparatus 10 may be a digital camera of other types such as a fixed lens type. The imaging apparatus main body 12 is an example of an "electronic apparatus main body" and an "imaging apparatus main body" according to the embodiment of the technology of the present disclosure.

An imaging element 44 is disposed in the imaging apparatus main body 12. In a case where the interchangeable lens 14 is mounted on a front surface of the imaging apparatus main body 12, subject light that shows a subject is transmitted through the interchangeable lens 14, and an image of the subject light is formed on a light receiving surface 44A of the imaging element 44. Image data that indicates an image of the subject is generated by the imaging element 44.

A hybrid finder (registered trademark) 16 is disposed in the imaging apparatus main body 12. For example, the hybrid finder 16 here refers to a finder in which an optical viewfinder (hereinafter, referred to as the OVF) and an electronic viewfinder (hereinafter, referred to as the EVF) are selectively used. The abbreviation OVF stands for "optical viewfinder". In addition, the abbreviation EVF stands for "electronic viewfinder".

A release button 20 and a dial 22 are disposed on an upper surface of the imaging apparatus main body 12. The dial 22 operates in a case of setting an operation mode of an imaging system, an operation mode of a playback system, and the like. Accordingly, an imaging mode and a playback mode are selectively set as an operation mode in the imaging apparatus 10. The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position.

Figure 2:
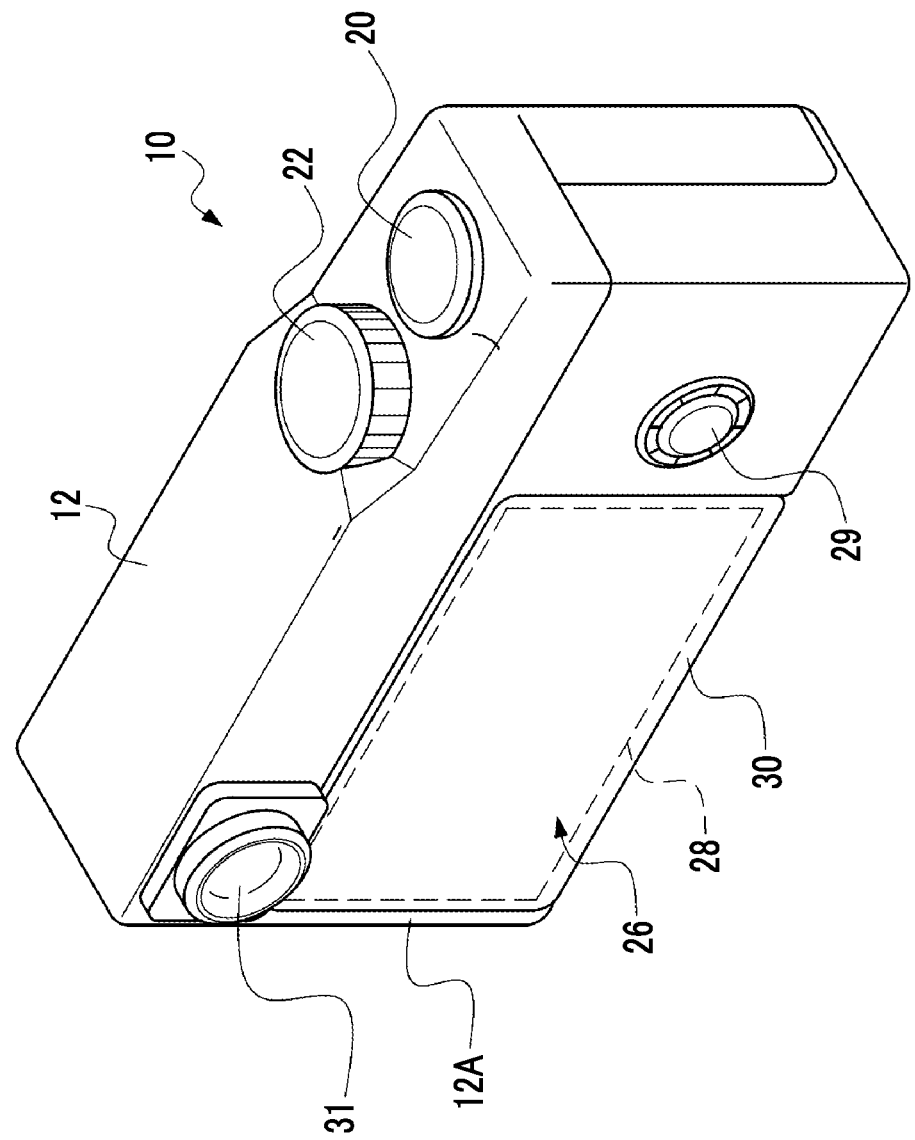
FIG. 2 is a perspective rear view illustrating an example of the exterior on a rear surface side of the imaging apparatus according to the embodiment in a state where a touch panel display unit is closed.

As illustrated in FIG. 2 as an example, a touch panel display unit 26, an instruction key 29, and a finder eyepiece portion 31 are disposed on a rear surface 12A of the imaging apparatus main body 12.

The touch panel display unit 26 comprises a touch panel display 28 and a housing 30 and is attached to be openable and closable with respect to the rear surface 12A. In the example illustrated in FIG. 2, a state where the touch panel display unit 26 is closed with respect to the rear surface 12A is illustrated. The housing 30 has a thin plate shape and is formed to have a laterally long quadrangular shape in a rear view of the imaging apparatus main body 12 illustrated in FIG. 2. The housing 30 accommodates the touch panel display 28. The touch panel display 28 is rotationally opened and closed with respect to the rear surface 12A in an up-down direction (tilting direction) in the rear view of the imaging apparatus main body 12 illustrated in FIG. 2 (refer to FIG. 3 as well). In the example illustrated in FIG. 2, the touch panel display 28 is in a state of being hidden on the rear surface 12A side by the housing 30.

An optical image visible using the OVF and a live view image that is an electronic image visible using the EVF are selectively projected to the finder eyepiece portion 31, and the optical image and the live view image are visible to a user through the finder eyepiece portion 31.

The instruction key 29 receives various instructions. For example, the "various instructions" here refer to an instruction to display a menu screen on which various menus can be selected, an instruction to select one or a plurality of menus, an instruction to confirm a selected content, an instruction to delete the selected content, an auto focus mode, a manual focus mode, zooming in, zooming out, and frame advance.

Figure 3:
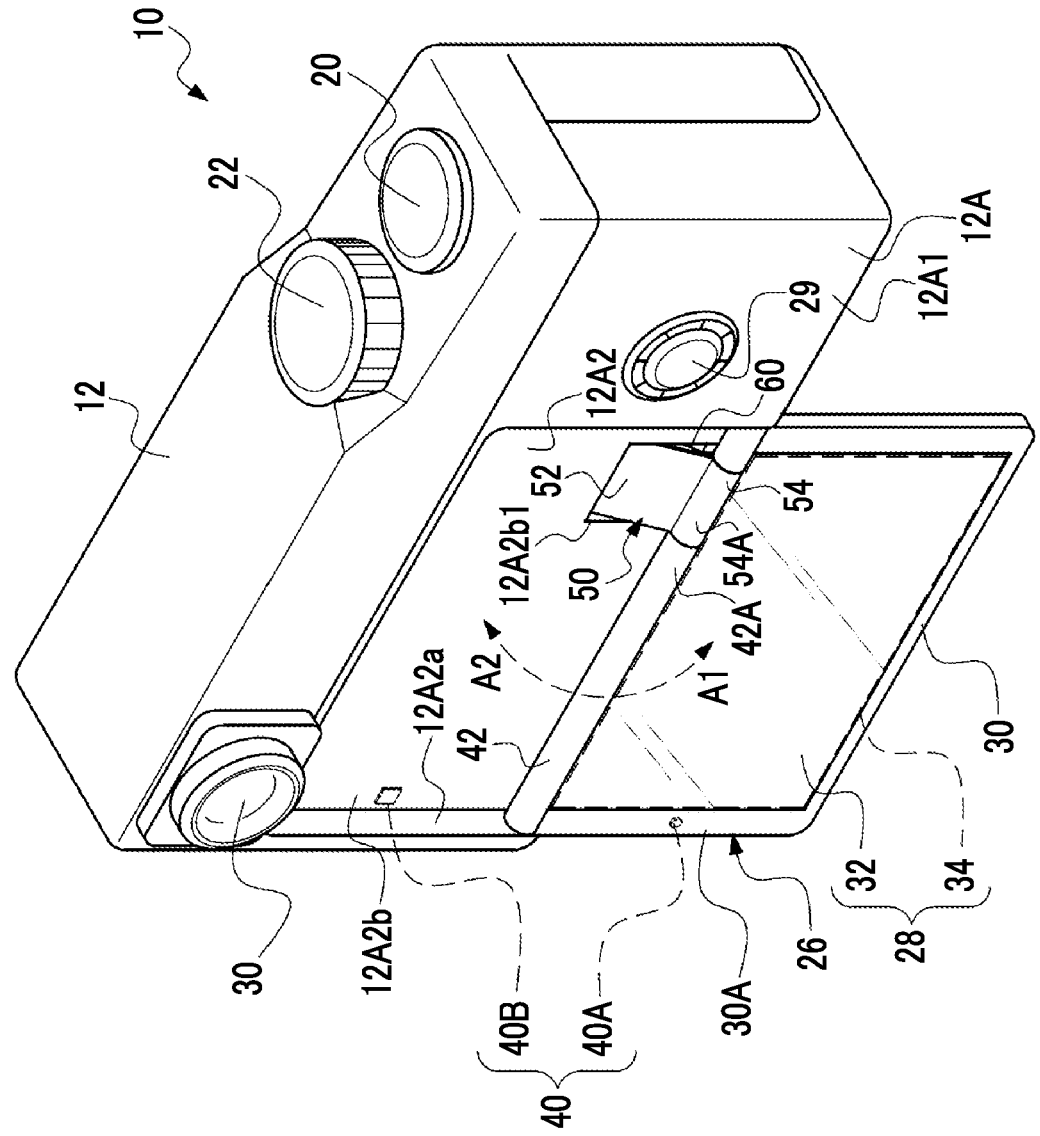
FIG. 3 is a perspective rear view illustrating an example of the exterior on the rear surface side of the imaging apparatus according to the embodiment in a state where the touch panel display unit is opened.

As illustrated in FIG. 3 as an example, the touch panel display 28 comprises a display 32 and a touch panel 34. The display 32 displays images, text information, and the like. The live view image obtained by consecutive imaging in a case where the imaging apparatus 10 is in the imaging mode is displayed on the display 32. In addition, a mark (for example, a frame) indicating a focus area provided by an instruction of the user in the auto focus mode is displayed on the display 32 in a superimposed manner on the live view image. In addition, the display 32 is used for displaying a still picture image obtained by imaging in a case where an imaging instruction for the still picture image is provided. Furthermore, the display 32 is used for displaying a playback image and displaying a menu screen and the like in a case where the imaging apparatus 10 is in the playback mode.

The touch panel 34 is a transmissive touch panel and is overlaid on a surface of a display region of the display 32. The touch panel 34 receives an instruction from the user by detecting a contact of an object such as a finger or a stylus pen. Here, a capacitance type touch panel is employed as the touch panel 34. However, this is merely an example. For example, an electromagnetic induction type touch panel or a touch panel of a type obtained by combining the capacitance type with the electromagnetic induction type can also be applied as the touch panel 34.

In addition, here, an out-cell touch panel display in which the touch panel 34 is overlaid on the surface of the display region of the display 32 is employed as an example of the touch panel display 28. However, this is merely an example. For example, an on-cell or in-cell touch panel display can also be applied as the touch panel display 28.

The rear surface 12A has a flat portion 12A1 and a recess portion 12A2. The flat portion 12A1 is formed to have a flat surface shape, and the instruction key 29 is arranged in the flat portion 12A1. The recess portion 12A2 is formed to have a laterally long quadrangular shape in the rear view of the imaging apparatus main body 12 at a position adjacent to the instruction key 29, and is recessed into the imaging apparatus main body 12 from the flat portion 12A1. The imaging apparatus main body 12 comprises a hinge 42, and the touch panel display unit 26 is pivotally supported by the imaging apparatus main body 12 through the hinge 42. In the rear view of the imaging apparatus main body 12 in the example illustrated in FIG. 3, the hinge 42 is arranged at a position at which the touch panel display unit 26 is rotatable from one of a bottom surface 12A2$b$ side in a depth direction of the recess portion 12A2 or a bottom surface side of the imaging apparatus main body 12 toward the other. Specifically, the hinge 42 is arranged in a lower edge portion of the recess portion 12A2 and is pivotally supported to be rotatable with respect to inner walls in a width direction among inner walls 12A2$a$ of the recess portion 12A2. A torsion spring (not illustrated) is incorporated in the hinge 42. The touch panel display unit 26 is biased to the bottom surface 12A2$b$ side by an elastic force of the torsion spring.

The touch panel display unit 26 rotates in a stepless manner through the hinge 42 from one of the bottom surface 12A2$b$ side or the bottom surface side of the imaging apparatus main body 12 toward the other. A rotatable range (hereinafter, referred to as a "rotation range") of the touch panel display unit 26 is approximately 180 degrees. However, 180 degrees is merely an example. The rotation range may be less than 180 degrees or exceed 180 degrees.

An attitude of the touch panel display unit 26 within the rotation range of the touch panel display unit 26 is held by a frictional force of the hinge 42 against the elastic force of the torsion spring. Here, w % bile an example of a form of rotating the touch panel display unit 26 in a stepless manner is exemplified, the technology of the present disclosure is not limited thereto. For example, the touch panel display unit 26 may rotate in multiple steps through the hinge 42. For example, rotation of the touch panel display unit 26 in multiple steps is implemented by incorporating a ball clicking mechanism into the hinge 42.

The touch panel display unit 26 is opened and closed with respect to the bottom surface 12A2b by rotating in a direction A1 and a direction A2 about a rotation axis of the hinge 42. Here, the direction A1 refers to a direction of separating the touch panel 34 from the bottom surface 12A2b. The direction A2 refers to a direction of bringing the touch panel 34 close to the bottom surface 12A2b. Rotation of the touch panel display unit 26 in the direction A1 and the direction A2 is implemented by the hinge 42. That is, the touch panel display unit 26 is opened and closed with respect to the bottom surface 12A2b by rotating in the direction A1 and the direction A2 through the hinge 42. The touch panel display unit 26, by rotating in the direction A2, is accommodated in the recess portion 12A2 in a state where the touch panel display unit 26 is erected perpendicular to the bottom surface of the imaging apparatus main body 12.

Rotation of the touch panel display unit 26 is manually implemented. That is, for example, the user rotates the touch panel display unit 26 by applying a force to the touch panel display unit 26 by hand. However, the method of manual rotation is merely an example. The touch panel display unit 26 may be rotated by applying a driving force generated by a driving source such as a motor or a solenoid to the touch panel display unit 26. The bottom surface 12A2b is an example of a "specific surface" and a "rear surface of the imaging apparatus main body" according to the embodiment of the technology of the present disclosure.

An opening 12A2b1 having a rectangular shape in the rear view of the imaging apparatus main body 12 is formed on one end part side of the hinge 42 in the bottom surface 12A2b. The opening 12A2b1 communicates with a space inside the imaging apparatus main body 12. The touch panel display unit 26 comprises a flexible substrate 60. The flexible substrate 60 is inserted in the imaging apparatus main body 12 through the opening 12A2b1.

The imaging apparatus main body 12 comprises a cover member 50. The cover member 50 is a member that protects the flexible substrate 60. The flexible substrate 60 is covered with the cover member 50 from the touch panel display unit 26 side. Accordingly, the flexible substrate 60 is protected from the finger of the user and/or dust and the like.

The cover member 50 comprises a cover member main body 52 and a holding portion 54. The holding portion 54 is a cylindrical body formed to have a cylindrical shape and is disposed in a base end portion of the cover member main body 52. The hinge 42 is rotatably inserted in the holding portion 54. In other words, the cover member 50 is attached to be rotatable with respect to the hinge 42 on the same axis as the hinge 42 through the holding portion 54. In addition, an outer peripheral surface 54A of the holding portion 54 is formed in plane with an outer peripheral surface 42A of the hinge 42.

The cover member main body 52 is a protrusion that extends in the imaging apparatus main body 12 from the outer peripheral surface 54A through the opening 12A2b1. A surface of the cover member main body 52 on the touch panel display unit 26 side is formed to have a planar shape.

The rotation range of the touch panel display unit 26 is broadly divided into an opened range that is a state where the touch panel display unit 26 is opened with respect to the bottom surface 12A2b, and a closed range that is a state where the touch panel display unit 26 is closed with respect to the bottom surface 12A2b. The closed range refers to a range of from a first position (refer to FIG. 13) to a second position (refer to FIG. 13) that is a position on the bottom surface 12A2b side of the first position. The imaging apparatus main body 12 comprises a sensor 40. The sensor 40 contactlessly detects positioning of the touch panel display unit 26 within the closed range of the rotation range of the touch panel display unit 26.

The sensor 40 is a magnetic sensor and includes a magnet 40A and a hall element 40B. The magnet 40A is disposed in the touch panel display unit 26. Specifically, in the rear view of the imaging apparatus main body 12 illustrated in FIG. 3, the magnet 40A is embedded in a central portion of a left edge portion in an outer peripheral edge portion of the housing 30. Meanwhile, the hall element 40B is disposed in the imaging apparatus main body 12. Specifically, the hall element 40B is disposed on the bottom surface 12A2b side and is arranged at a position facing the magnet 40A in a case where the touch panel display unit 26 is accommodated in the recess portion 12A2. In addition, the hall element 40B is arranged inside the imaging apparatus main body 12 further than the bottom surface 12A2b so as not to be exposed to the touch panel display unit 26 side from the bottom surface 12A2b. In addition, the magnet 40A and the hall element 40B are arranged at positions at which a magnetic field of the magnet 40A is detected with a predetermined intensity or more by the hall element 40B in a case where the touch panel display unit 26 is positioned within the closed range.

That is, in a case where the intensity of the magnetic field detected by the hall element 40B is greater than or equal to the predetermined intensity, positioning of the touch panel display unit 26 within the closed range is detected by the hall element 40B. Conversely, in a case where the intensity of the magnetic field detected by the hall element 40B is less than the predetermined intensity, positioning of the touch panel display unit 26 within the opened range is detected by the hall element 40B. Where the touch panel display unit 26 is positioned within the closed range is specified by a control circuit 70 (refer to FIG. 4 and FIG. 14), described later, from the intensity of the magnetic field detected by the hall element 40B.

Figure 4:
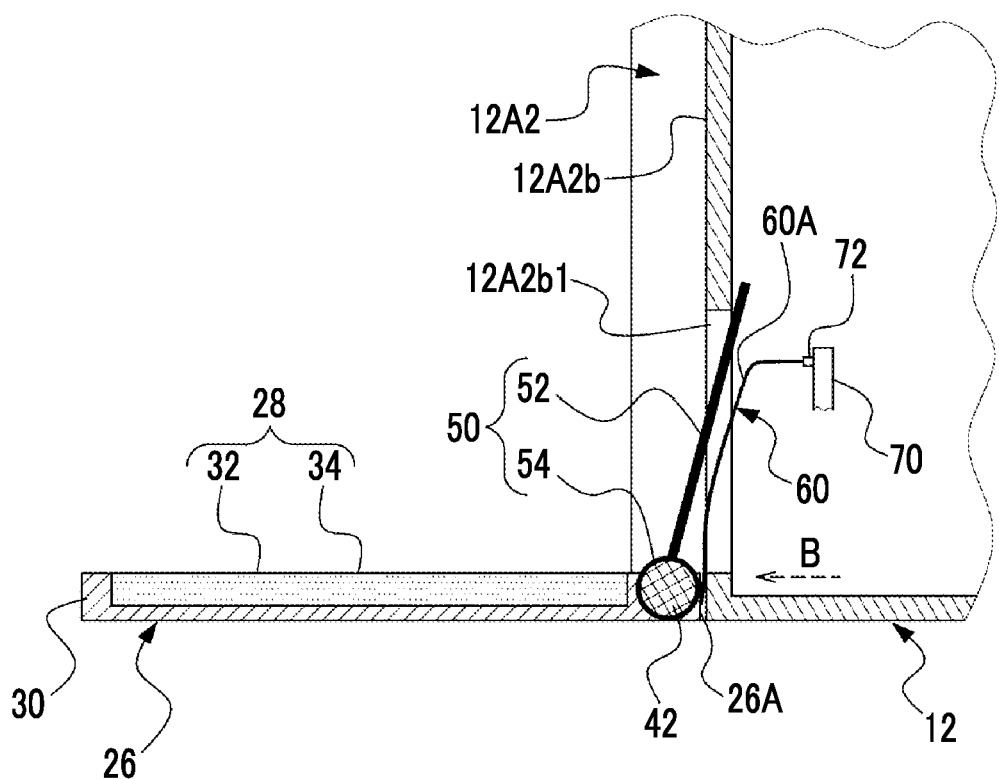
FIG. 4 is a partial cross-sectional view illustrating an example of an aspect of a state where the touch panel display unit of the imaging apparatus according to the embodiment is opened by approximately 90 degrees.

As illustrated in FIG. 4 as an example, the control circuit 70 is accommodated in the imaging apparatus main body 12. The control circuit 70 is a circuit that controls the touch panel display unit 26 and, for example, switches a power supply of the touch panel display unit 26 ON and OFF or controls a display content of the display 32 in accordance with the instruction received by the touch panel 34.

The flexible substrate 60 extends in the imaging apparatus main body 12 through the opening 12A2b1 from a hinge side edge portion 26A that is an edge portion on a side on which the hinge 42 is positioned in an outer peripheral edge portion of the touch panel display unit 26. One end of the flexible substrate 60 is connected to the touch panel display unit 26, and the other end of the flexible substrate 60 is connected to the control circuit 70 through a connector 72.

The cover member main body 52 is inserted in the imaging apparatus main body 12 from the hinge side edge portion 26A through the opening 12A2b1 and covers an exposed location 60A of the flexible substrate 60 that is exposed to the touch panel display unit 26 side from the opening 12A2b1. The holding portion 54 is disposed on the hinge side edge portion 26A side of the touch panel display unit 26 and holds an attitude of the cover member main body 52 at a position at which the exposed location 60A is covered.

Figure 5:
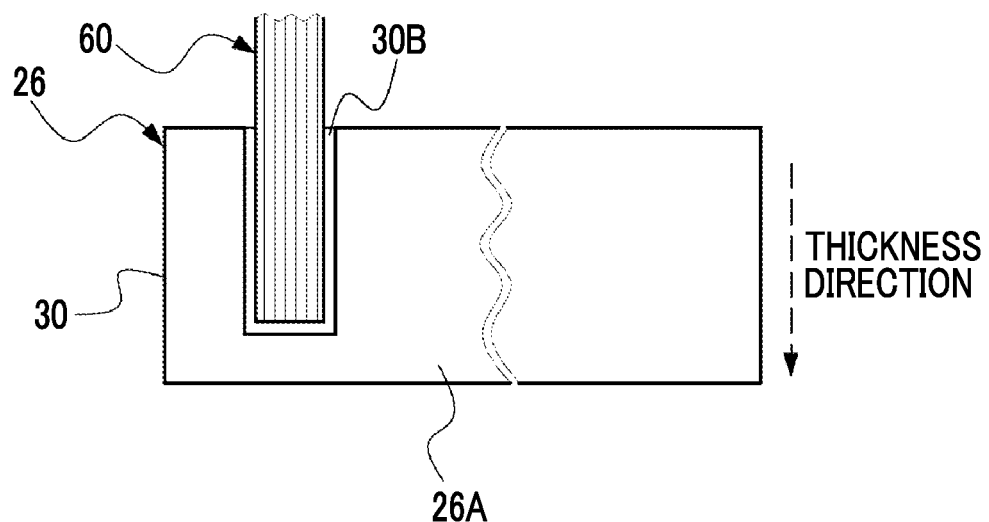
FIG. 5 is a diagram illustrating an aspect example of the touch panel display unit in a case where the touch panel display unit is seen from a hinge side edge portion side of the touch panel display unit included in the imaging apparatus according to the embodiment.

In a case where the hinge side edge portion 26A is seen from a direction of arrow B (refer to FIG. 4), the hinge side edge portion 26A includes a notch 30B as illustrated in FIG. 5 as an example. The notch 30B is formed in a part on the hinge 42 side of an outer peripheral edge of the housing 30 along a thickness direction (refer to FIG. 5) of the housing 30. The flexible substrate 60 leads from the notch 30B.

Figure 6:
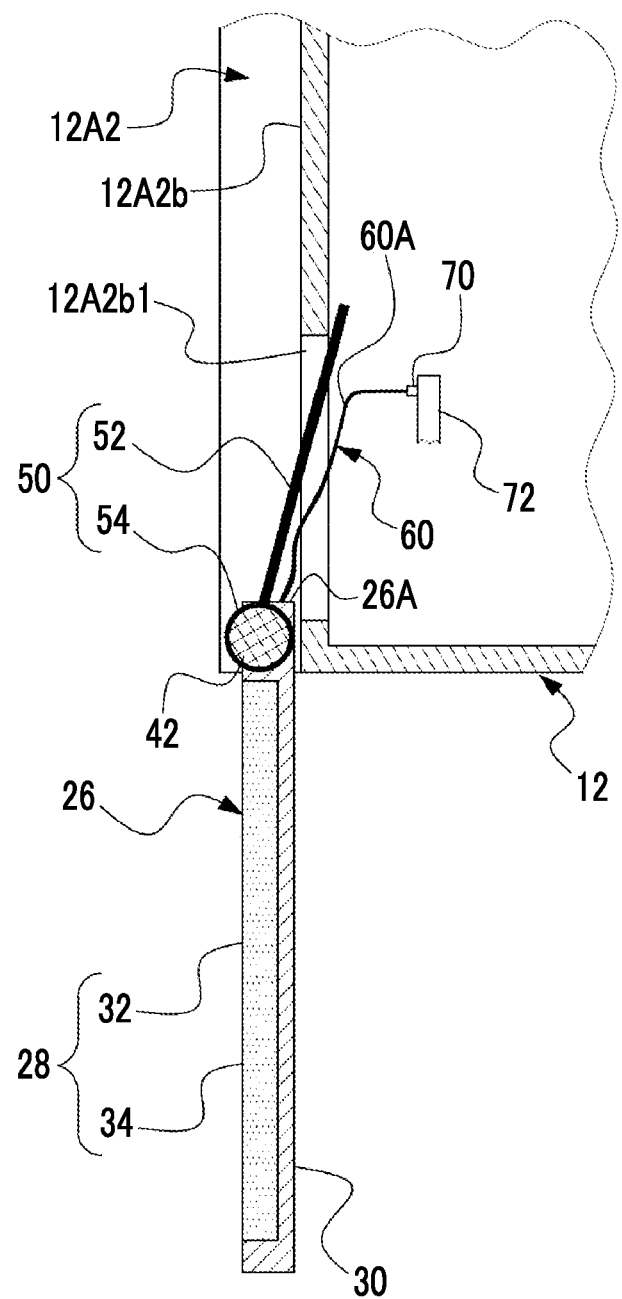
FIG. 6 is a partial cross-sectional view illustrating an example of an aspect of a state (fully opened state) where the touch panel display unit of the imaging apparatus according to the embodiment is opened by approximately 180 degrees.
Figure 7:
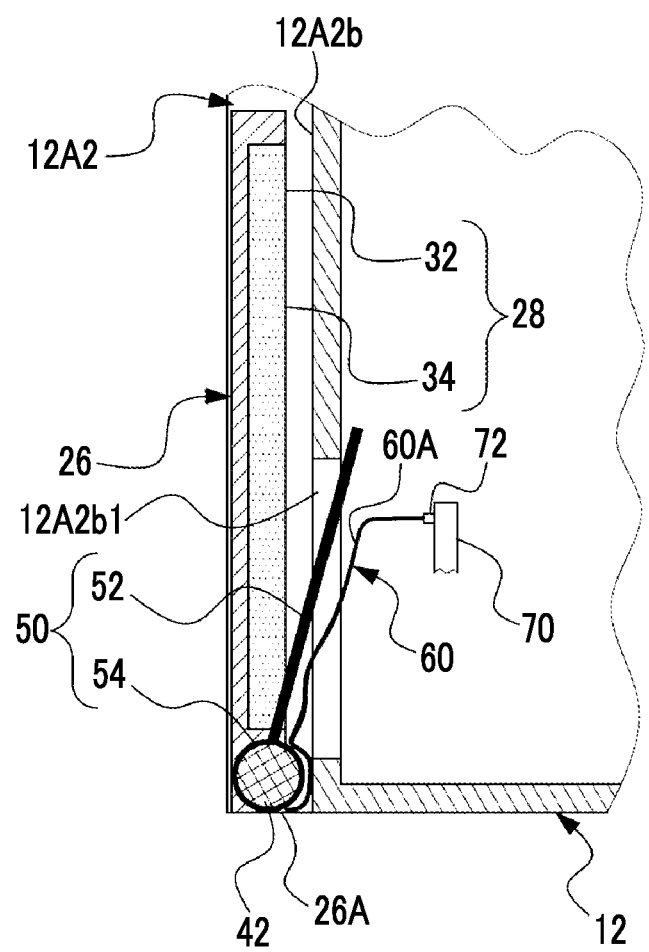
FIG. 7 is a partial cross-sectional view illustrating an example of an aspect of a state (closed state) where the touch panel display unit of the imaging apparatus according to the embodiment is accommodated in a recess portion.

As illustrated in FIG. 6 and FIG. 7 as an example, the cover member 50 is inserted in the imaging apparatus main body 12 through the opening 12A2b1 regardless of whether or not the touch panel display unit 26 is rotated through the hinge 42. In the example illustrated in FIG. 6, the touch panel display unit 26 is fully opened and is separated from the bottom surface 12A2b compared to the example illustrated in FIG. 7. However, the cover member 50 is inserted in the imaging apparatus main body 12 through the opening 12A2b1. That is, the cover member 50 is inserted in the imaging apparatus main body 12 through the opening 12A2b1 regardless of a degree of separation of the touch panel display unit 26 from the bottom surface 12A2b.

Here, an installation location of the sensor 40 is considered. In a case where positioning of the touch panel display unit 26 within the closed range is detected by the sensor 40, making a power supply of the touch panel display 28 OFF causes a state where the instruction from the user is not received by the touch panel 34. The closed range of the touch panel display unit 26 may be as narrow as possible within a range having a width in which the instruction from the user can be received (for example, within a range in which approximately one or two fingers of the user can be brought into contact with the touch panel 34). For example, enabling the instruction to be provided to the touch panel 34 even under a situation (for example, a dense situation such as a crowd of people) in which it is difficult to rotate the touch panel display unit 26 to a fully opened state is preferred from a viewpoint of usability.

Figure 8:
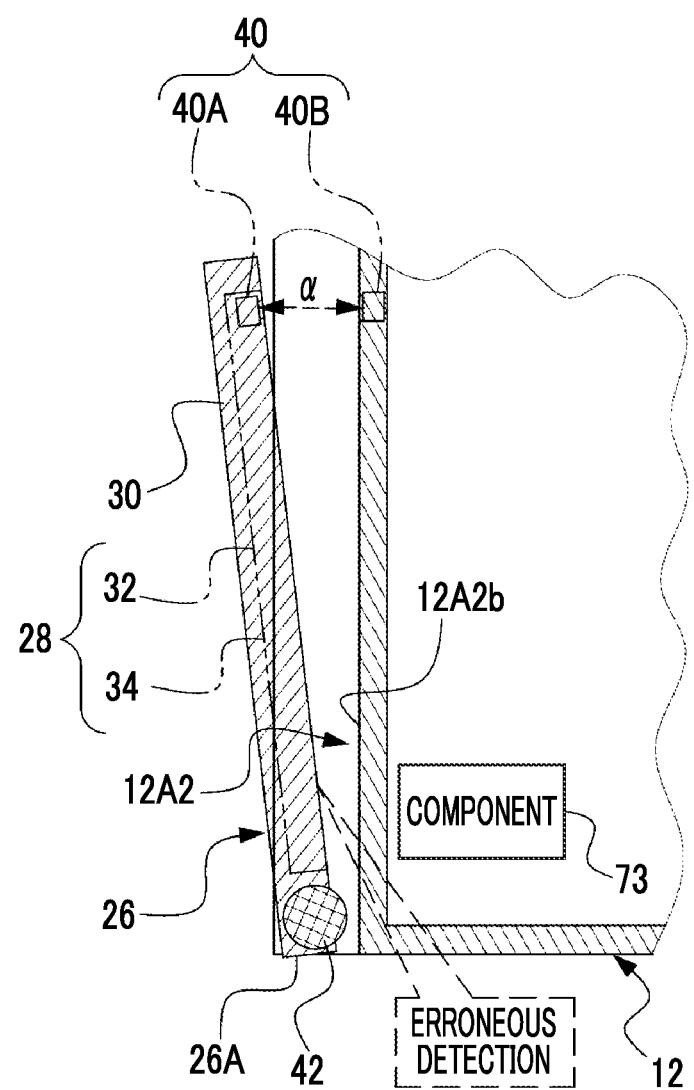
FIG. 8 is a partial cross-sectional view illustrating an example of a positional relationship between the touch panel display unit and an imaging apparatus main body in a case where an opening degree of the touch panel display unit is excessively low.

However, as illustrated in FIG. 8 as an example, in a case where a distance α between the magnet 40A and the hall element 40B is excessively short, rotating the touch panel display unit 26 close to the closed range may cause erroneous detection of the touch panel 34 due to electrical characteristics of a component 73 in the imaging apparatus main body 12. For example, an electric circuit such as the control circuit 70, an exterior of the imaging apparatus main body 12, a substrate, a wiring line, a metal component, and/or a member including a conductor is exemplified as the component 73.

In a case where the touch panel 34 performs erroneous detection, setting not intended by the user may be performed on the imaging apparatus 10. For example, in the auto focus mode, in a case where the instruction for the focus area of the imaging apparatus 10 is provided by the user through the touch panel 34, the focus area may be set for a location not intended by the user.

Figure 9:
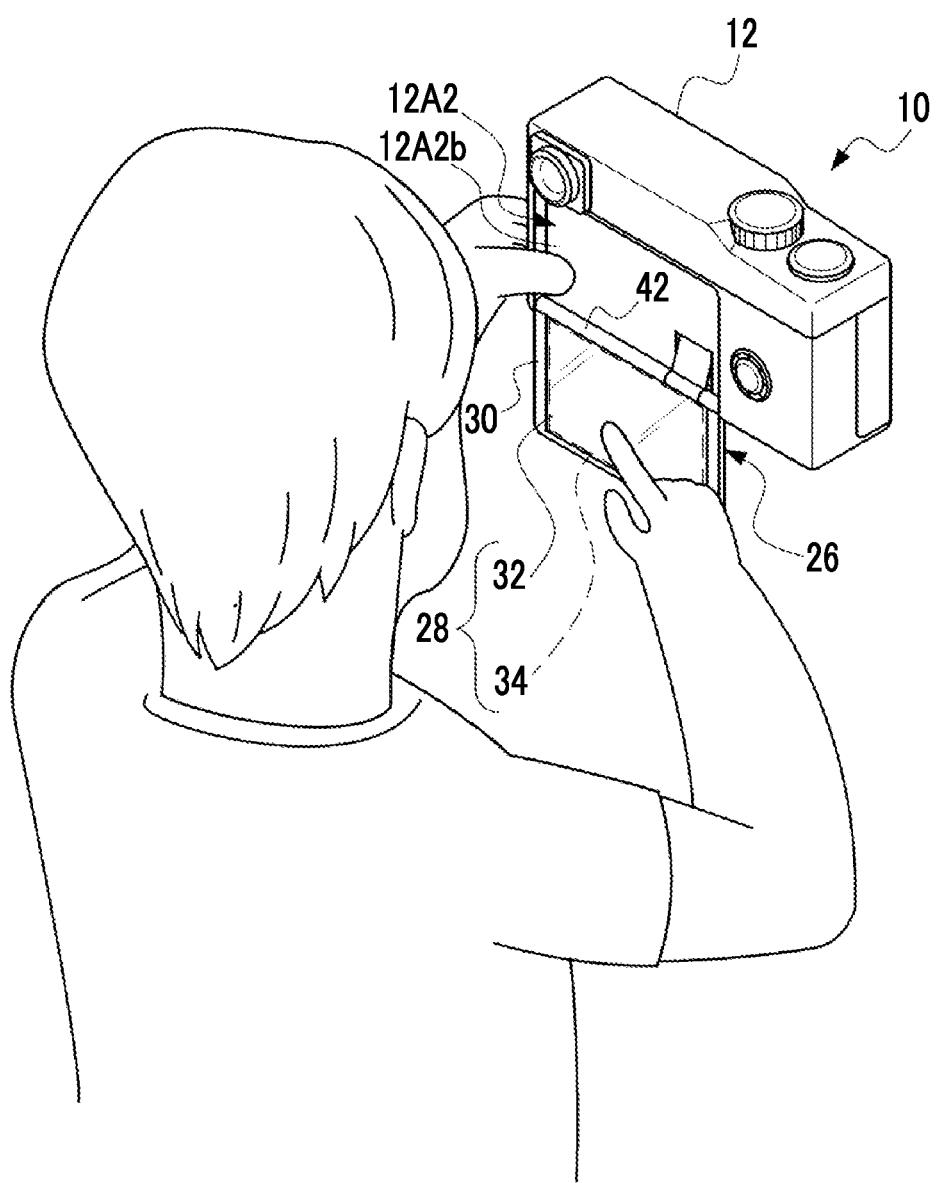
FIG. 9 is a schematic perspective view illustrating an example of an aspect in which a user is bringing a finger into contact with a touch panel.
Figure 10:
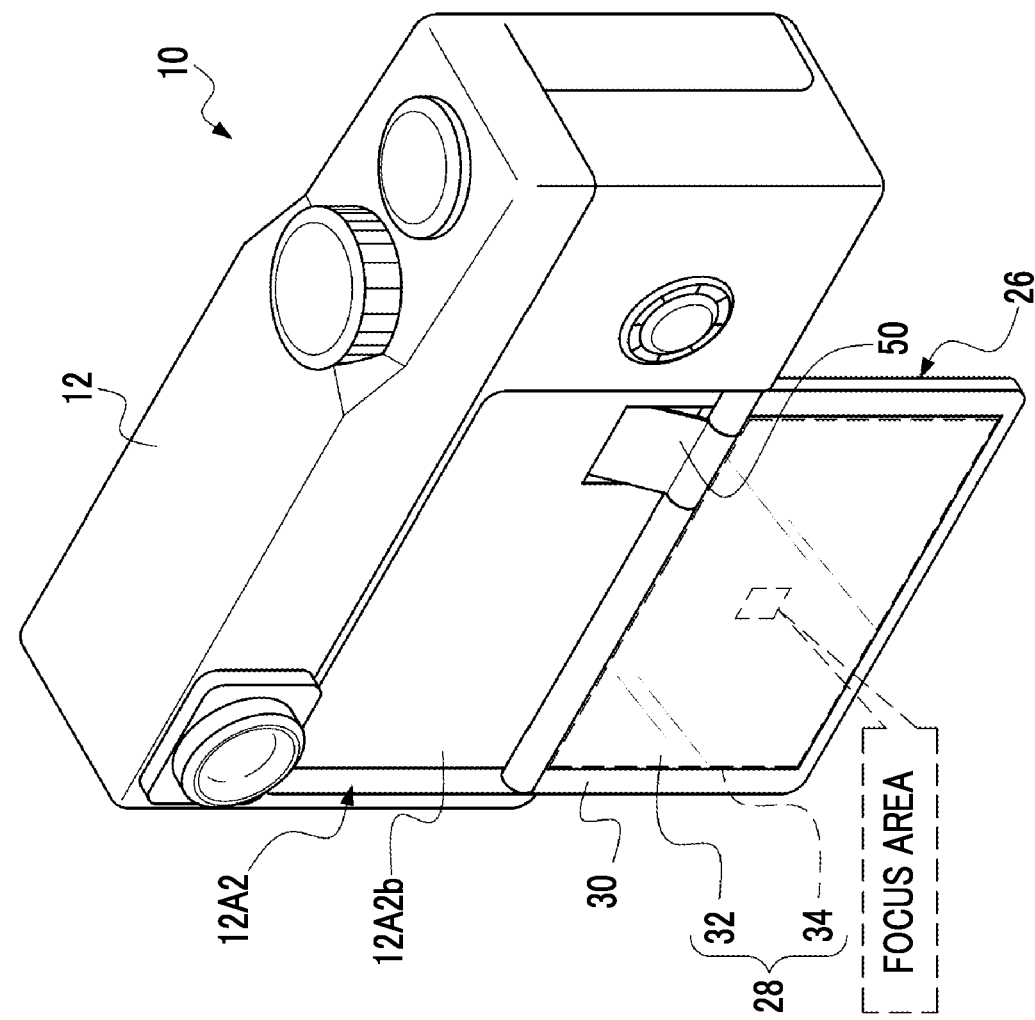
FIG. 10 is a schematic perspective view illustrating an example of an aspect of a touch panel display in a case where an instruction for a focus area is received in a central portion of the touch panel.
Figure 11:
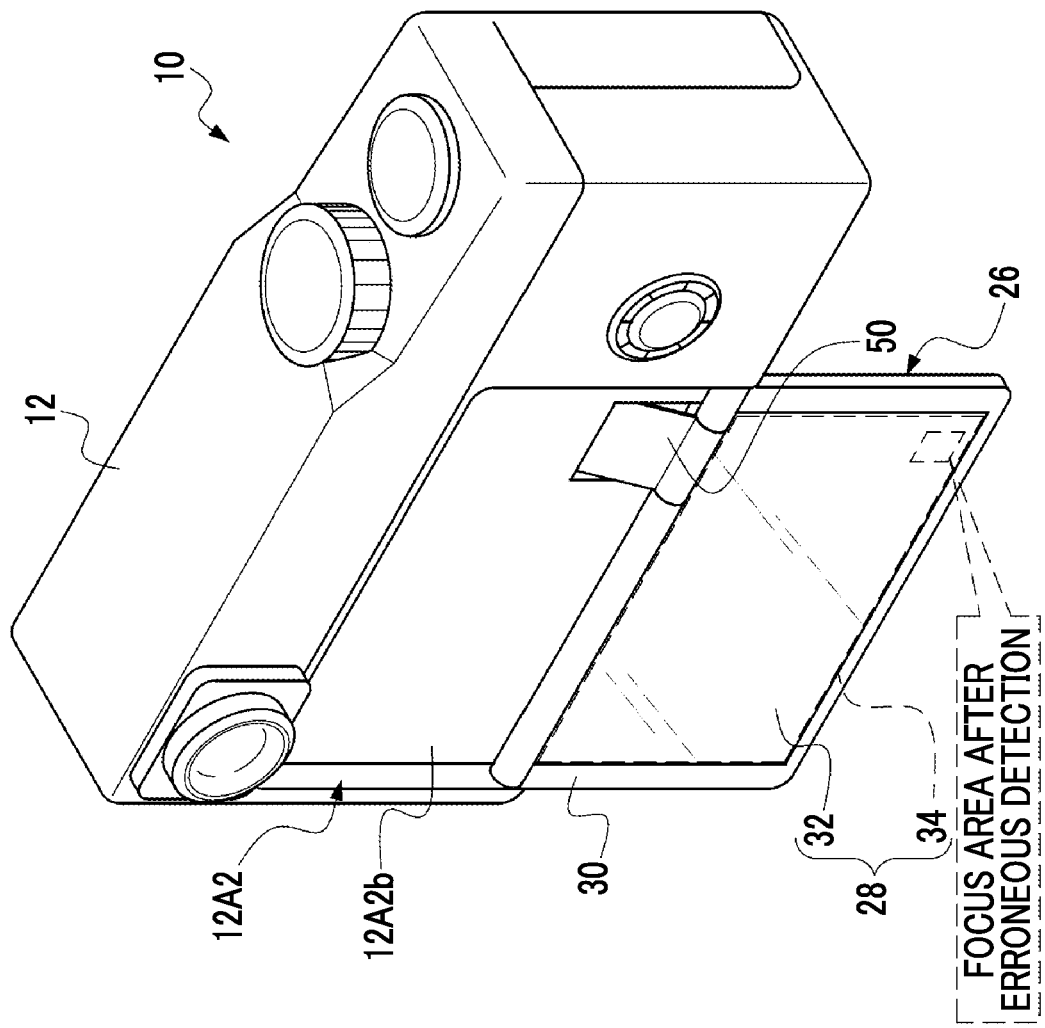
FIG. 11 is a schematic perspective view illustrating an example of an aspect of the touch panel display in a case where an instruction position of the focus area is changed by erroneous detection of the touch panel.

For example, as illustrated in FIG. 9 and FIG. 10, in a state where the user provides the instruction for setting a central portion of the touch panel display 28 as the focus area by bringing the finger into contact with the central portion of the touch panel 34, rotating the touch panel display unit 26 to near the distance α illustrated in FIG. 8 causes erroneous detection of the touch panel 34 due to the electrical characteristics of the component 73. In a case where the touch panel 34 performs erroneous detection, as illustrated in FIG. 1I as an example, a state where the instruction for the focus area is provided for a position (in the example illustrated in FIG. 11, a corner of the touch panel display 28) not intended by the user is caused. Consequently, the focus area is set for a location not intended by the user.

Figure 12:
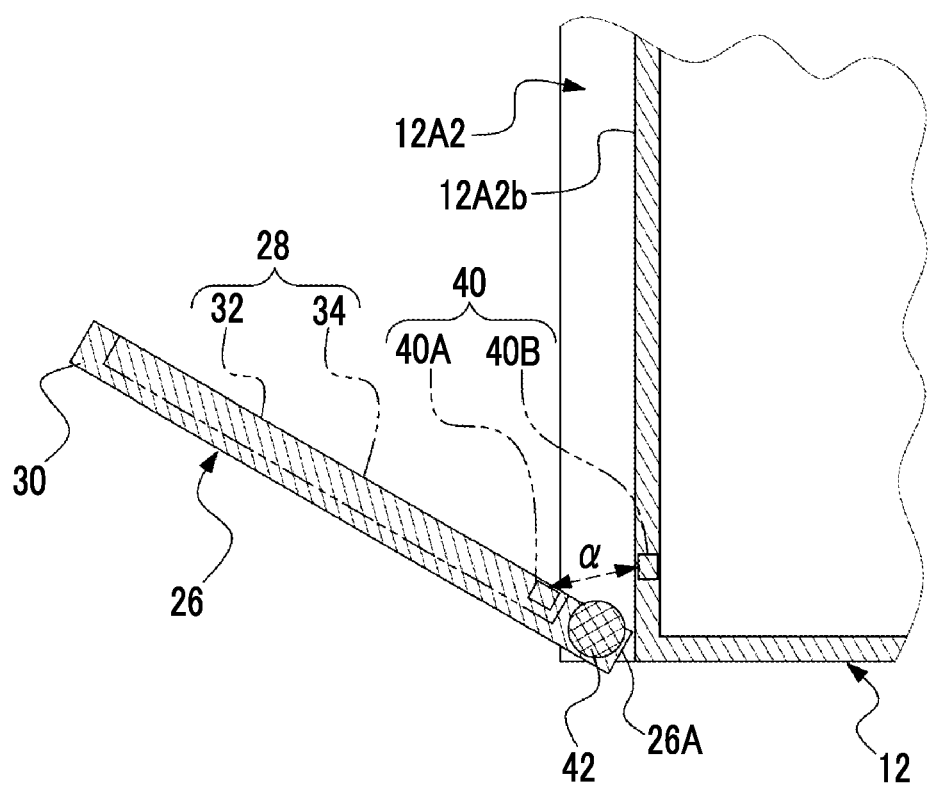
FIG. 12 is a partial cross-sectional view illustrating an example of the positional relationship between the touch panel display unit and the imaging apparatus main body in a case where the opening degree of the touch panel display unit is excessively high.

As illustrated in FIG. 12 as an example, in a case where the distance α is increased compared to the example illustrated in FIG. 8 by arranging the sensor 40 at a position as close as possible to the hinge 42, an electrical effect provided to the touch panel 34 by the component 73 can be decreased compared to the example illustrated in FIG. 8. However, the usability is decreased.

Figure 13:
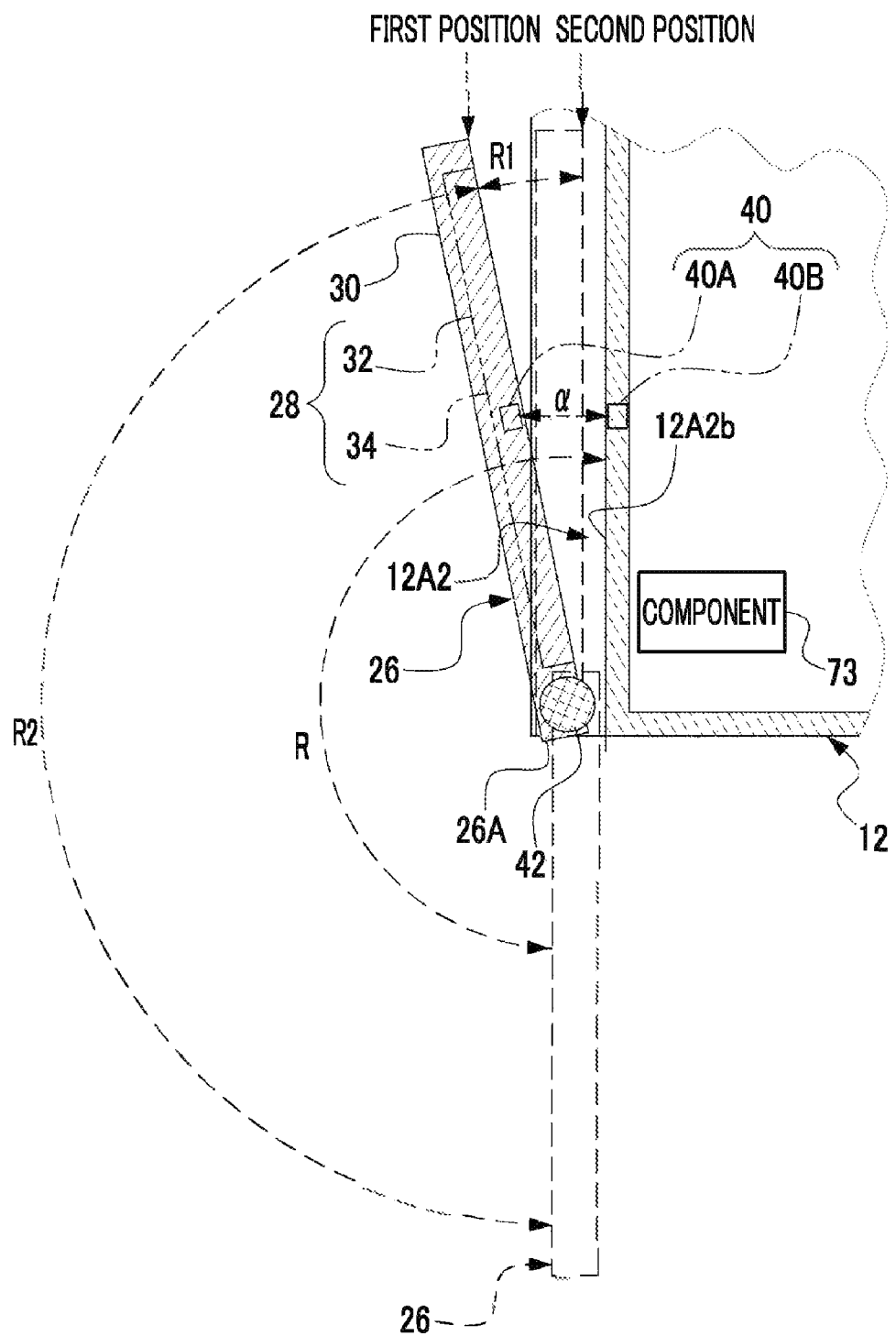
FIG. 13 is a partial cross-sectional view for describing an installation position of a sensor of the imaging apparatus according to the embodiment.

Therefore, in the imaging apparatus 10 according to the present embodiment, as illustrated in FIG. 13 as an example, the sensor 40 is arranged at a position at which the distance α is longer than the example illustrated in FIG. 8 and is shorter than the example illustrated in FIG. 12. The distance α illustrated in FIG. 13 is a distance predetermined as a distance with which the touch panel 34 performs erroneous detection due to the electrical characteristics of the component 73. Specifically, the distance a illustrated in FIG. 13 is a distance derived in advance by a test using an actual apparatus and/or computer simulation or the like as the longest distance with which the touch panel 34 performs erroneous detection due to the electrical characteristics of the component 73.

In the example illustrated in FIG. 13, a rotation range R of the touch panel display unit 26 is illustrated. The rotation range R is broadly divided into a closed range R1 and an opened range R2 that are uniquely decided by the distance α. The closed range R1 is a range of from the first position to the second position. The first position is a position predetermined as a position at which the touch panel 34 performs erroneous detection due to the electrical characteristics of the component 73. The second position is, for example, a position at which the entire touch panel display unit 26 is accommodated in the recess portion 12A2. The opened range R2 is a region that is separated from the bottom surface 12A2b further than the first position in the rotation range R of the touch panel display unit 26. In other words, the region separated from the bottom surface 12A2b further than the first position refers to a range other than the closed range R1 in the rotation range R of the touch panel display unit 26.

Here, while the position at which the entire touch panel display unit 26 is accommodated in the recess portion 12A2 is illustrated as the second position, the technology of the present disclosure is not limited thereto. For example, the second position may be a position that is separated from the bottom surface 12A2b further than the position at which the entire touch panel display unit 26 is accommodated in the recess portion 12A2, and that is closer to the bottom surface 12A2b than the first position.

Figure 14:
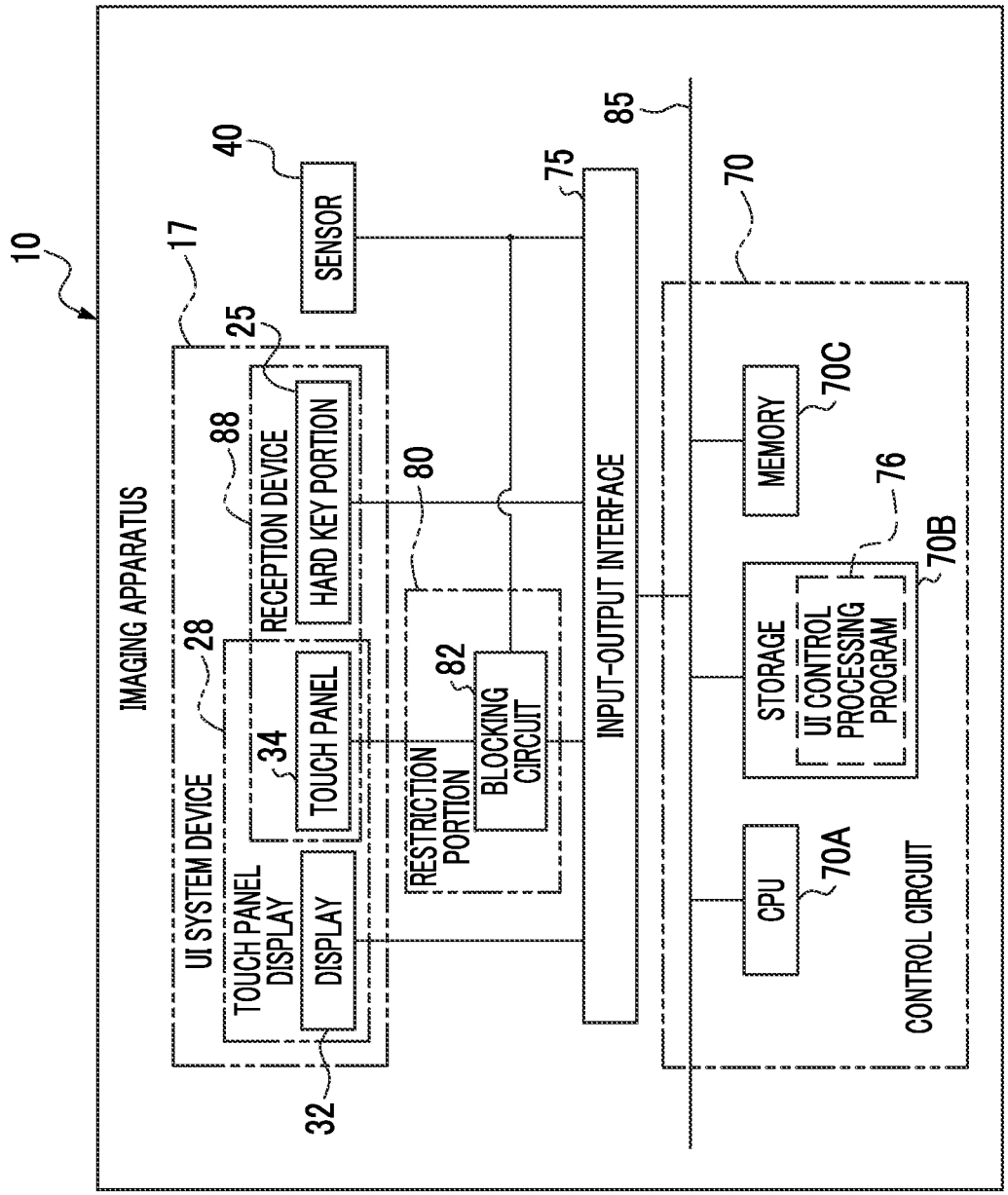
FIG. 14 is a block diagram illustrating an example of a hardware configuration of an electric system of the imaging apparatus according to the embodiment.

As illustrated in FIG. 14 as an example, the imaging apparatus 10 comprises a UI system device 17, the sensor 40, the control circuit 70, an input-output interface 75, and a restriction portion (restriction circuit) 80. The control circuit 70 is implemented by, for example, SoC. However, SoC is merely an example. The control circuit 70 may be implemented by SiP or the like.

The control circuit 70 comprises a CPU 70A, a storage 70B, and a memory 70C. The CPU 70A, the storage 70B, and the memory 70C are connected through a bus 85. In the example illustrated in FIG. 14, while one bus is illustrated as the bus 85 for convenience of illustration, a plurality of buses may be used. The bus 85 may be a serial bus or may be a parallel bus including a data bus, an address bus, a control bus, and the like.

The storage 70B stores various parameters and various programs including a UI control processing program 76 (described in detail later). The storage 70B is a non-volatile storage device. Here, a flash memory is employed as an example of the storage 70B. The flash memory is merely an example. Instead of the flash memory or together with the flash memory, an EEPROM, an HDD, and/or an SSD or the like may be applied as the storage 70B. In addition, the memory 70C temporarily stores various types of information and is used as a work memory. A RAM is exemplified as an example of the memory 70C. However, the technology of the present disclosure is not limited thereto. A storage device of other types may be used.

The CPU 70A reads out a necessary program from the storage 70B and executes the read program on the memory 70C. The CPU 70A controls the entire imaging apparatus 10 in accordance with the program executed on the memory 70C.

A plurality of external apparatuses and the bus 85 are connected to the input-output interface 75. The input-output interface 75 controls exchange of various signals between the plurality of external apparatuses and the control circuit 70. In the example illustrated in FIG. 14, the UI system device 17, the sensor 40, the control circuit 70, and the restriction portion 80 are connected to the input-output interface 75 as the plurality of external apparatuses.

The UI system device 17 is a device that presents information to the user or receives the instruction from the user. The control circuit 70 acquires various types of information from the UI system device 17 and controls the UI system device 17.

The UI system device 17 comprises the touch panel display 28 and a reception device 88. The display 32 is connected to the bus 85 through the input-output interface 75. The CPU 70A displays various types of information on the display 32. In addition, the touch panel 34 is connected to the bus 85 through a blocking circuit 82, described later, and the input-output interface 75. A detection result of the touch panel 34 is output to the control circuit 70 through the input-output interface 75. The CPU 70A operates in accordance with the detection result of the touch panel 34. Here, for example, the detection result refers to whether or not detection is performed by the touch panel 34, and positional information (for example, coordinates) indicating a position detected by the touch panel 34.

The reception device 88 comprises a hard key portion 25. The hard key portion 25 includes a plurality of hard keys and includes the release button 20 (refer to FIG. 1), the dial 22 (refer to FIG. 1), and the instruction key 29 (refer to FIG. 2). The hard key portion 25 is connected to the bus 85 through the input-output interface 75. The CPU 70A acquires an instruction received by the hard key portion 25 and operates in accordance with the acquired instruction.

The restriction portion 80 restricts a sensitivity of the touch panel 34 in a case where the touch panel display unit 26 is positioned within the closed range. For example, in a case where the touch panel display unit 26 is positioned within the closed range in accordance with an operation of rotating in a direction (in the example illustrated in FIG. 3, a direction of arrow A2) of closing the touch panel display unit 26 with respect to the bottom surface 12A2*b* (refer to FIG. 3, FIG. 4, and FIG. 13), the sensitivity of the touch panel 34 is restricted by the restriction portion 80.

In the example illustrated in FIG. 14, the restriction portion 80 includes the blocking circuit 82. Restriction of the sensitivity of the touch panel 34 is implemented by operating the blocking circuit 82. The blocking circuit 82 is a circuit that blocks output of a detection indication signal indicating whether or not detection is performed by the touch panel 34. The restriction portion 80 restricts the sensitivity of the touch panel 34 by causing the blocking circuit 82 to block the output of the detection indication signal in a case where the touch panel display unit 26 is positioned within the closed range. Specifically, the sensor 40 is connected to the blocking circuit 82. In a case where positioning of the touch panel display unit 26 within the closed range is detected by the sensor 40, the restriction portion 80 restricts the sensitivity of the touch panel 34 by causing the blocking circuit 82 to block the output of the detection indication signal.

Figure 15:
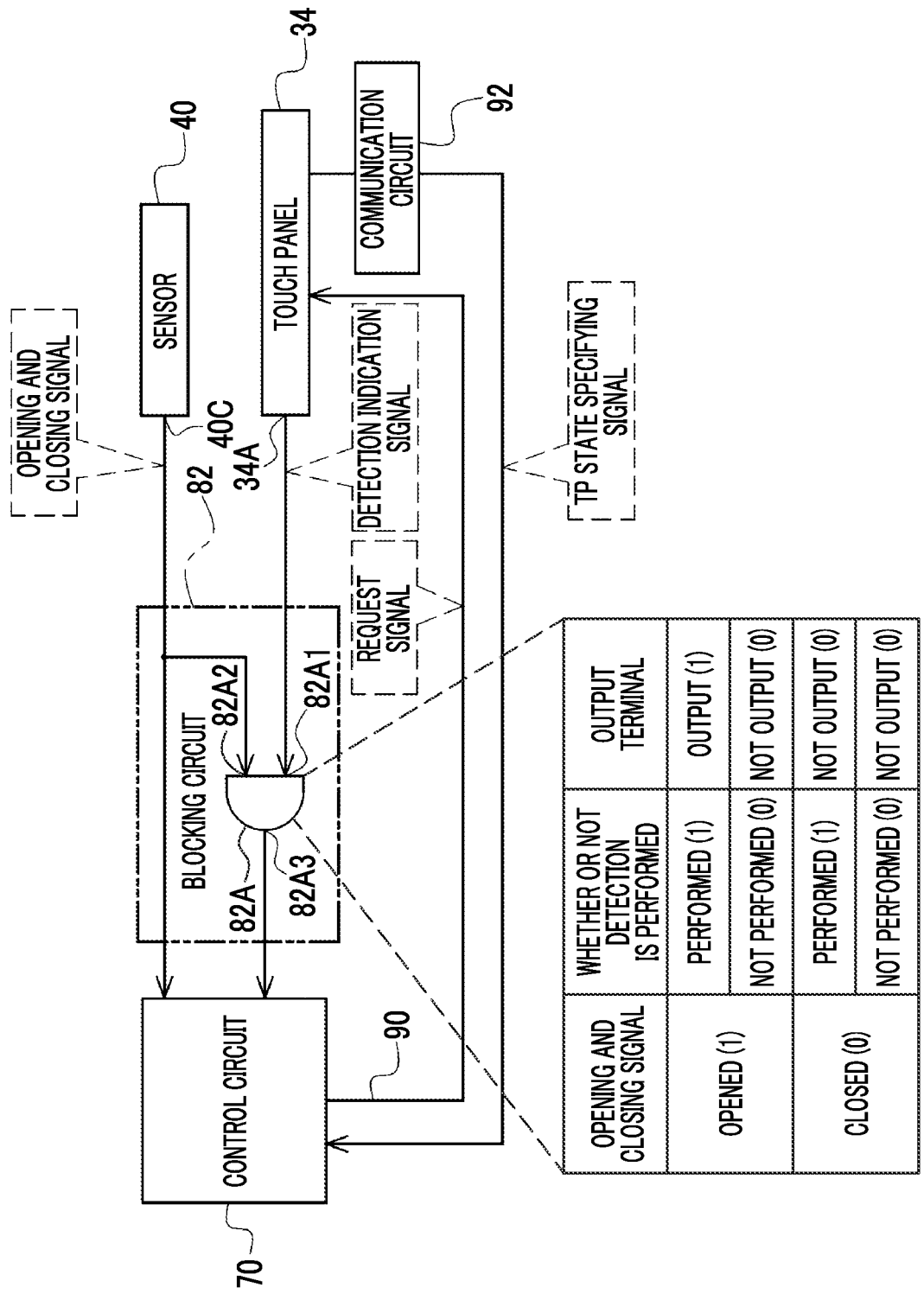
FIG. 15 is a configuration diagram illustrating an example of a configuration of a blocking circuit included in a restriction portion of the imaging apparatus according to the embodiment.

As illustrated in FIG. 15 as an example, the sensor 40 includes an output terminal 40C. The sensor 40 outputs, from the output terminal 40C, an opening and closing signal indicating in which of the closed range and the opened range the touch panel display unit 26 is positioned. For example, the opening and closing signal is a signal of which a signal level transitions from one of a low level and a high level to the other. In a case where the signal level of the opening and closing signal is the low level, the opening and closing signal indicates that the touch panel display unit 26 is positioned within the closed range. In a case where the signal level of the opening and closing signal is the high level, the opening and closing signal indicates that the touch panel display unit 26 is positioned within the opened range. Hereinafter, for convenience of description, a signal indicating that the touch panel display unit 26 is positioned within the closed range will be referred to as a "closing signal", and a signal indicating that the touch panel display unit 26 is positioned within the opened range will be referred to as an "opening signal".

Figure 24:
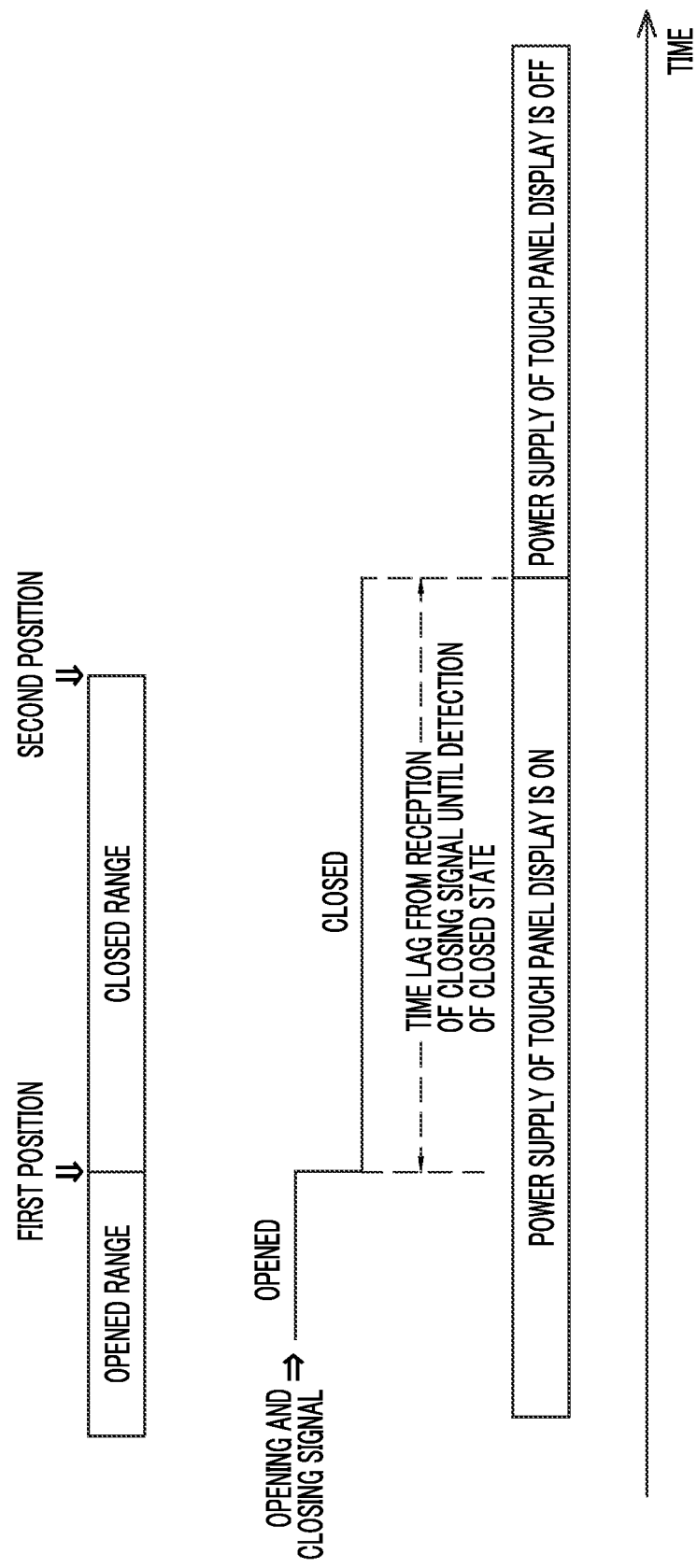
FIG. 24 is a time chart for describing a case where the touch panel performs erroneous detection.

In a case where the touch panel display unit 26 positioned within the opened range is rotated toward the bottom surface 12A2*b* by the user, and the touch panel display unit 26 reaches the first position, the closing signal is output from the sensor 40, and the closing signal is input into the control circuit 70. Generally, chattering occurs in a case where one of the opening signal and the closing signal is switched to the other (for example, in a case where the signal level of the opening and closing signal transitions from the high level to the low level. Therefore, in the control circuit 70, a control (hereinafter, referred to as a "chattering avoidance control") for avoiding an effect of chattering of the opening and closing signal is performed. In a case where the chattering avoidance control is performed, as illustrated in FIG. 24 as an example, a time lag of approximately a tens of milliseconds to approximately a few hundred milliseconds occurs until the closing signal is detected by the control circuit 70 after the closing signal is input into the control circuit 70 from the sensor 40. However, a time period from when the closing signal is output by the sensor 40 until erroneous detection of the touch panel 34 occurs (for example, a time period from when the closing signal is output by the sensor 40 until the electrical characteristics of the component 73 affect the touch panel 34) in a case where the touch panel display unit 26 is quickly closed is a few milliseconds to a few tens of milliseconds. Thus, while the time lag occurs, the touch panel 34 may perform erroneous detection due to the electrical characteristics and the like of the component 73. Here, for example. "quickly closed" means that the touch panel display unit 26 is closed faster than in a case where a touch panel display unit of a laptop personal computer (hereinafter, referred to as a "laptop computer") that is larger than the imaging apparatus 10 and includes the touch panel display unit which is rotationally opened and closed is closed. That is, the imaging apparatus 10 is smaller than the laptop computer, and a closing operation of the touch panel display unit 26 is faster than a closing operation of the touch panel display unit of the laptop computer. Thus, the imaging apparatus 10 is likely to have erroneous detection (for example, erroneous detection due to the electrical characteristics of the component 73) of the touch panel 34 accompanied by the closing operation of the touch panel display unit 26, compared to the laptop computer.

Therefore, in the present embodiment, the blocking circuit 82 includes an AND circuit 82A so that a signal (for example, a detection indicative signal described later) indicating that the touch panel 34 is touched is input into the control circuit 70 only in a case where the opening signal is output from the sensor 40, and the touch panel 34 is touched. The AND circuit 82A is an example of a "logic circuit" according to the embodiment of the technology of the present disclosure.

The AND circuit 82A includes a first input terminal 82A1, a second input terminal 82A2, and an output terminal 82A3. An output terminal 34A is connected to the first input terminal 82A1. The detection indication signal is input into the first input terminal 82A1 from the touch panel 34. An output terminal 40C is connected to the second input terminal 82A2. The opening and closing signal is input into the second input terminal 82A2 from the sensor 40. The control circuit 70 is connected to the output terminal 82A3. Accordingly, the AND circuit 82A outputs a logical product signal indicating a logical product of the detection indication signal input into the first input terminal 82A1 and the opening and closing signal input into the second input terminal 82A2 to the control circuit 70 from the output terminal 82A3.

The detection indication signal is a signal represented by a logical value of "0" or "1". That is, the detection indication signal is a signal represented by "0" (hereinafter, referred to as a "detection non-indicative signal") indicating that detection is not performed by the touch panel 34 (touch panel 34 is not touched), and "1" (hereinafter, referred to as the "detection indicative signal") indicating that detection is performed by the touch panel 34 (touch panel 34 is touched). In addition, the opening signal is a signal indicating "1", and the closing signal is a signal indicating "0". Accordingly, in a case where the touch panel display unit 26 is positioned within the opened range, the AND circuit 82A outputs the detection indicative signal (logical value of "1") to the control circuit 70. That is, the AND circuit 82A outputs the detection indicative signal as the logical product signal to the control circuit 70 from the output terminal 82A3 only in a case where the touch panel display unit 26 is positioned within the opened range, and the touch panel 34 detects a touch.

In the AND circuit 82A, a state where the detection indicative signal is input into the first input terminal 82A1, and the closing signal is input into the second input terminal 82A2 means a state where the touch panel 34 is performing erroneous detection. Thus, the AND circuit 82A outputs "0" that is the detection non-indicative signal to the control circuit 70.

The control circuit 70 is connected to the touch panel 34 through a communication line 90. In a case where the detection indicative signal is input into the control circuit 70 from the AND circuit 82A, the control circuit 70 outputs a request signal for requesting the touch panel 34 to output a touch panel (TP) state specifying signal for specifying a state of the touch panel 34, to the touch panel 34 through the communication line 90. Here, for example, the state of the touch panel 34 refers to the positional information, the number of touched locations, and a touch action (for example, swiping, flicking, pinching in, pinching out, tapping, double tapping, and long pressing).

In response to the request signal from the control circuit 70, the touch panel 34 outputs the TP reception specifying signal to the control circuit 70 using a communication circuit 92. That is, the state of the touch panel 34 is recognized by the control circuit 70 after the detection indicative signal is input into the control circuit 70 as an interrupt signal. Well-known three-wire serial communication and/or inter-integrated-circuit (I2C) or the like is applied to the communication circuit 92.

Figure 16:
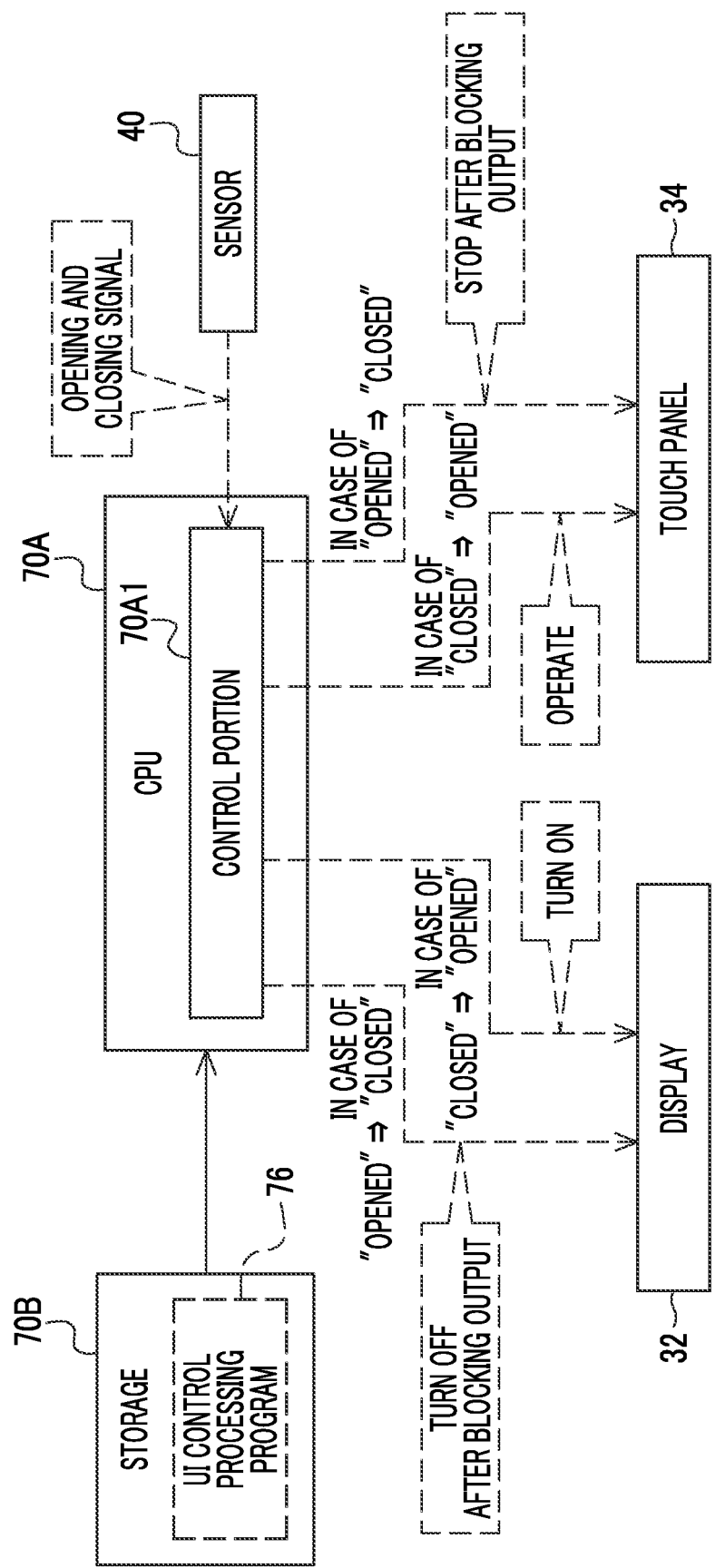
FIG. 16 is a function block diagram illustrating an example of functions of the imaging apparatus according to the embodiment.

As illustrated in FIG. 16 as an example, the CPU 70A operates as a control portion 70A1 by reading out the UI control processing program 76 from the storage 70B and executing the read UI control processing program 76. The control portion 70A1 performs a control for making the power supply of the touch panel display unit 26 OFF after the sensitivity of the touch panel 34 is decreased below a predetermined sensitivity by the restriction portion 80 (refer to FIG. 14) at the first position (refer to FIG. 13) in the course of reaching of the touch panel display unit 26 to a closed state. Here, the predetermined sensitivity refers to a sensitivity that is derived in advance by a test using the actual apparatus and/or computer simulation or the like as the lowest sensitivity with which a contact of an object (for example, the finger or the stylus pen) on the touch panel 34 can be detected. In addition, here, the course of reaching of the touch panel display unit 26 to the closed state refers to, specifically, the course of closing of the touch panel display unit 26 with respect to the bottom surface 12A2b in accordance with the operation of rotating in the direction (for example, the direction of arrow A2 illustrated in FIG. 3) of closing the touch panel display unit 26 with respect to the bottom surface 12A2b (refer to FIG. 3 and FIG. 13). In the present embodiment, the sensitivity of the touch panel 34 is decreased below the predetermined sensitivity by blocking the output of the detection indicative signal using the blocking circuit 82 (refer to FIG. 14 and FIG. 15).

In addition, in the present embodiment, while an example of a form of making the power supply of the touch panel display unit 26 OFF after the sensitivity of the touch panel 34 is decreased below the predetermined sensitivity by the restriction portion 80, the technology of the present disclosure is not limited thereto. For example, at least a power supply of the touch panel 34 out of the display 32 and the touch panel 34 may be made OFF after the sensitivity of the touch panel 34 is decreased below the predetermined sensitivity by the restriction portion 80.

The control portion 70A1 controls the display 32 and the touch panel 34 in accordance with the opening and closing signal input from the sensor 40. Specifically, in a case where the touch panel display unit 26 moves from the opened range to the closed range, the control portion 70A1 turns the display 32 off by making a power supply of the display 32 OFF and stops operation of the touch panel 34 by making the power supply of the touch panel 34 OFF, after the output of the detection indicative signal is blocked by the blocking circuit 82. In addition, in a case where the touch panel display unit 26 moves from the closed range to the opened range, the control portion 70A1 turns the display 32 on by making the power supply of the display 32 ON and operates the touch panel 34 by making the power supply of the touch panel 34 ON. By making the power supply of the display 32 ON, images and the like can be displayed on the display 32. By making the power supply of the touch panel 34 ON, the sensitivity of the touch panel 34 is increased to greater than or equal to the predetermined sensitivity, and the touch panel 34 is set to a state where a contact of an object such as the finger of the user or the stylus pen can be detected.

Next, actions of parts of the imaging apparatus 10 according to the embodiment of the technology of the present disclosure will be described.

Figure 17:
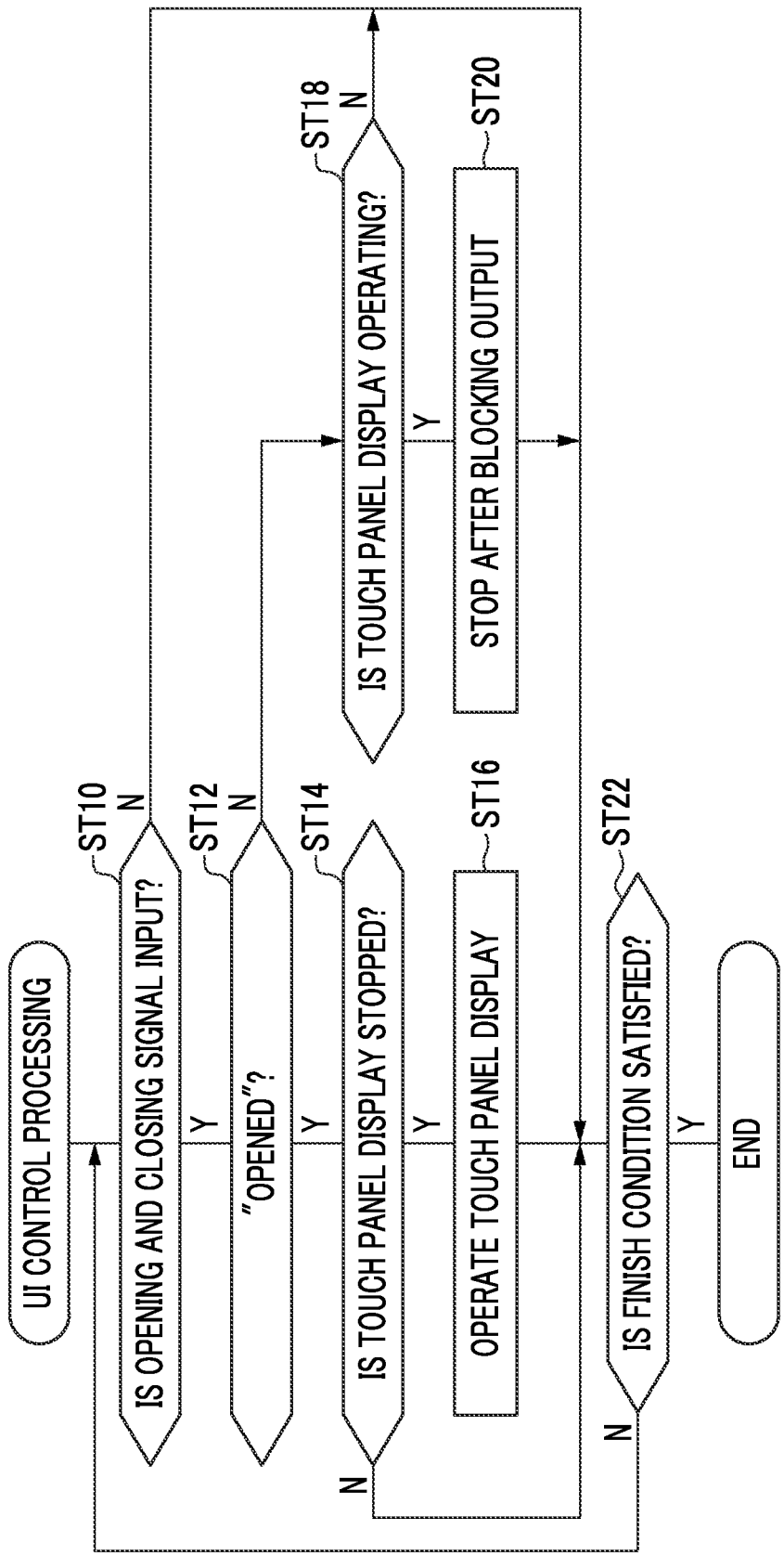
FIG. 17 is a flowchart illustrating an example of a flow of UI control processing according to the embodiment.

FIG. 17 is a flowchart illustrating an example of a flow of UI control processing executed by the CPU 70A in accordance with the UI control processing program 76. In the UI control processing illustrated in FIG. 17, first, in step ST10, the control portion 70A1 determines whether or not the opening and closing signal is input from the sensor 40. In step ST10, in a case where the opening and closing signal is not input from the sensor 40, a negative determination is made, and the UI control processing transitions to step ST22. In step ST10, in a case where the opening and closing signal is input from the sensor 40, a positive determination is made, and the UI control processing transitions to step ST12.

In step ST12, the control portion 70A1 determines whether or not the touch panel display unit 26 is positioned within the opened range based on the opening and closing signal input from the sensor 40. In step ST12, in a case where the touch panel display unit 26 is positioned within the closed range, a negative determination is made, and the UI control processing transitions to step ST18. In step ST12, in a case where the touch panel display unit 26 is positioned within the opened range, a positive determination is made, and the UI control processing transitions to step ST14.

In step ST14, the control portion 70A1 determines whether or not operation of the touch panel display 28 is stopped. The determination as to whether or not the operation of the touch panel display 28 is stopped is performed by determining whether or not the power supply of the touch panel display 28 is made OFF. In step ST14, in a case where the touch panel display 28 is operating, a negative determination is made, and the UI control processing transitions to step ST22. In step ST14, in a case where the operation of the touch panel display 28 is stopped, a positive determination is made, and the UI control processing transitions to step ST16.

In step ST16, the control portion 70A1 operates the touch panel display 28 by making the power supply of the touch panel display 28 ON. After processing of step ST16 is executed, the UI control processing transitions to step ST22.

In step ST18, the control portion 70A1 determines whether or not the touch panel display 28 is operating. The determination as to whether or not the touch panel display 28 is operating is performed by determining whether or not the power supply of the touch panel display 28 is made ON. In step ST18, in a case where the touch panel display 28 is not operating, a negative determination is made, and the UI control processing transitions to step ST22. In step ST18, in a case where the touch panel display 28 is operating, a positive determination is made, and the UI control processing transitions to step ST20.

In step ST20, the control portion 70A1 stops the operation of the touch panel display 28 by making the power supply of the touch panel display 28 OFF after the output of the detection indicative signal from the touch panel 34 is blocked by the blocking circuit 82 (refer to FIG. 14 and FIG. 15). After processing of step ST20 is executed, the UI control processing transitions to step ST22.

In step ST22, the control portion 70A1 determines whether or not a condition (hereinafter, referred to as a "UI control processing finish condition") under which the UI control processing is finished is satisfied. A condition that an instruction to finish the UI control processing is received by the reception device 88 (refer to FIG. 14) is exemplified as an example of the UI control processing finish condition. In step ST22, in a case where the UI control processing finish condition is not satisfied, a negative determination is made, and the UI control processing transitions to step ST10. In step ST22, in a case where the UI control processing finish condition is satisfied, a positive determination is made, and the UI control processing is finished.

Figure 18:
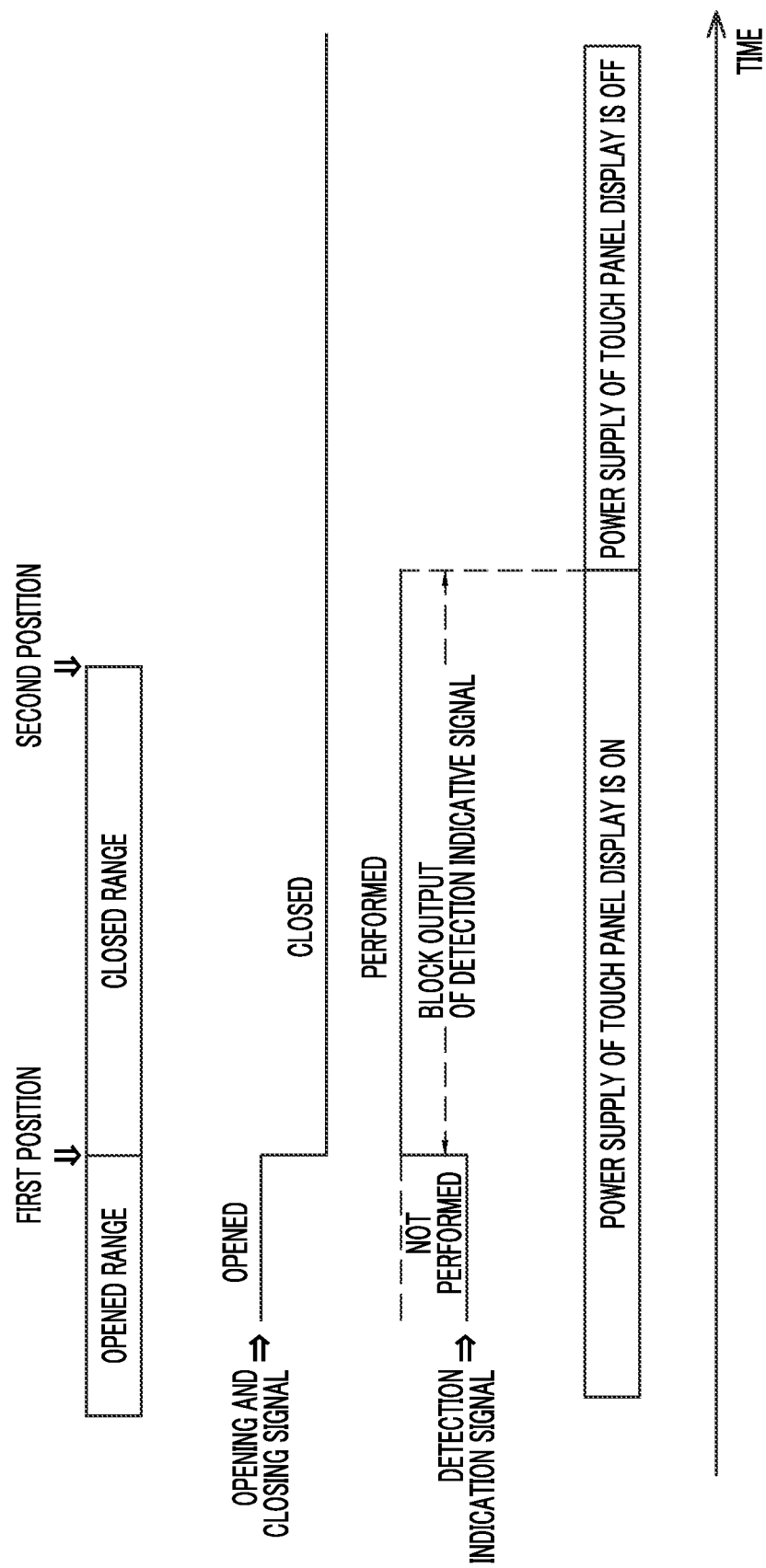
FIG. 18 is a time chart illustrating an example of a mutual relationship among a position of the touch panel display unit, an opening and closing signal, a detection indication signal, and ON and OFF states of a power supply of the touch panel display.

FIG. 18 is a time chart illustrating an example of a mutual relationship among a position of the touch panel display unit 26, the opening and closing signal, the detection indication signal, and ON and OFF states of the power supply of the touch panel display 28.

As illustrated in FIG. 18 as an example, in a case where the touch panel display unit 26 is positioned within the opened range, the power supply of the touch panel display 28 is made ON regardless of whether or not detection is performed by the touch panel 34. In a case where the touch panel display unit 26 moves to the closed range from the opened range in accordance with the operation of rotating in the direction of closing the touch panel display unit 26 with respect to the bottom surface 12A2b, the output of the detection indicative signal is blocked by the blocking circuit 82 while a state where the power supply of the touch panel display 28 is made ON is maintained. That is, by blocking the output of the detection indicative signal using the blocking circuit 82, the sensitivity of the touch panel 34 is restricted.

Accordingly, erroneous detection of the touch panel 34 in a case where the touch panel display unit 26 is closed with respect to the bottom surface 12A2b can be avoided. In addition, erroneous detection of the touch panel 34 in a case where the touch panel display unit 26 is positioned within the closed range in accordance with the operation of rotating in the direction of closing the touch panel display unit 26 with respect to the bottom surface 12A2b can be avoided.

In addition, even in a state where the power supply of the touch panel display 28 is made ON, the output of the detection indicative signal is blocked by the blocking circuit 82. Thus, erroneous detection of the touch panel 34 due to the electrical characteristics of the component 73 (refer to FIG. 13) in accordance with bringing of the touch panel 34 close to the bottom surface 12A2b can be avoided. Here, while an example of avoiding erroneous detection of the touch panel 34 due to the electrical characteristics of the component 73 is exemplified, the technology of the present disclosure is not limited thereto. According to the present configuration, erroneous detection caused by a contact of a part of the exterior of the imaging apparatus 10 or an object attached to the exterior of the imaging apparatus 10 on the touch panel 34 in accordance with bringing of the touch panel 34 close to the bottom surface 12A2b can also be avoided.

In addition, in the present embodiment, by the AND circuit 82A, the detection indicative signal from the touch panel 34 is input into the control circuit 70 only in a case where the touch panel display unit 26 is positioned within the opened range. In other words, while the closing signal is output from the sensor 40, the detection indicative signal is blocked by the AND circuit 82A so that the detection indicative signal from the touch panel 34 is not input into the control circuit 70. By using the AND circuit 82A, erroneous detection of the touch panel 34 can be avoided even in a case where the touch panel display unit 26 is quickly closed. In addition, since the AND circuit 82A is used, the detection indicative signal can be output to the control circuit 70 only in a case where the touch panel display unit 26 is positioned within the opened range in a state where the touch panel display unit 26 is positioned within the opened range, with a simple configuration compared to a case of using a circuit having a more complicated configuration than the AND circuit 82A.

As illustrated in FIG. 18 as an example, after the touch panel display unit 26 reaches the second position, the power supply of the touch panel display 28 is made OFF. That is, unless the touch panel display unit 26 reaches the second position, the ON state of the power supply of the touch panel display 28 is maintained. Thus, the touch panel display 28 can be quickly set to a usable state in a case where the touch panel display unit 26 returns to the opened range from the closed range, compared to a case where the power supply of the touch panel display 28 is made OFF at a point in time when the touch panel display unit 26 enters the closed range from the opened range.

In addition, in the imaging apparatus 10, the sensitivity of the touch panel 34 is restricted in a case where positioning of the touch panel display unit 26 within the closed range is detected by the sensor 40. Thus, according to the present configuration, restriction of the sensitivity of the touch panel 34 in a case where the touch panel display unit 26 is positioned within the closed range can be easily performed compared to a case of not using any of the sensor 40 or a sensor having a function corresponding to the sensor 40.

In addition, in the imaging apparatus 10, the touch panel 34 is opened and closed with respect to the bottom surface 12A2b by rotating in the direction of separating the touch panel 34 from the bottom surface 12A2b and the direction of bringing the touch panel 34 close to the bottom surface 12A2b through the hinge 42. Thus, according to the present configuration, erroneous detection of the touch panel 34 in a case where the touch panel 34 is closed with respect to the bottom surface 12A2b through the hinge 42 can be avoided.

In addition, in the imaging apparatus 10, the hinge 42 is arranged at a position at which the touch panel display unit 26 is rotatable from one of the bottom surface 12A2b side and the bottom surface side of the imaging apparatus main body 12 toward the other. Thus, according to the present configuration, the touch panel display unit 26 can be rotated from one of the bottom surface 12A2b side and the bottom surface side of the imaging apparatus main body 12 toward the other.

In addition, in the imaging apparatus 10, in a case where the touch panel display unit 26 is positioned within the closed range, the sensitivity of the touch panel 34 is restricted by blocking the output of the detection indicative signal using the blocking circuit 82. Thus, according to the present configuration, the sensitivity of the touch panel 34 can be easily restricted compared to a case of restricting the sensitivity of the touch panel 34 by an operation of the user in accordance with the position of the touch panel display unit 26.

Figure 19:
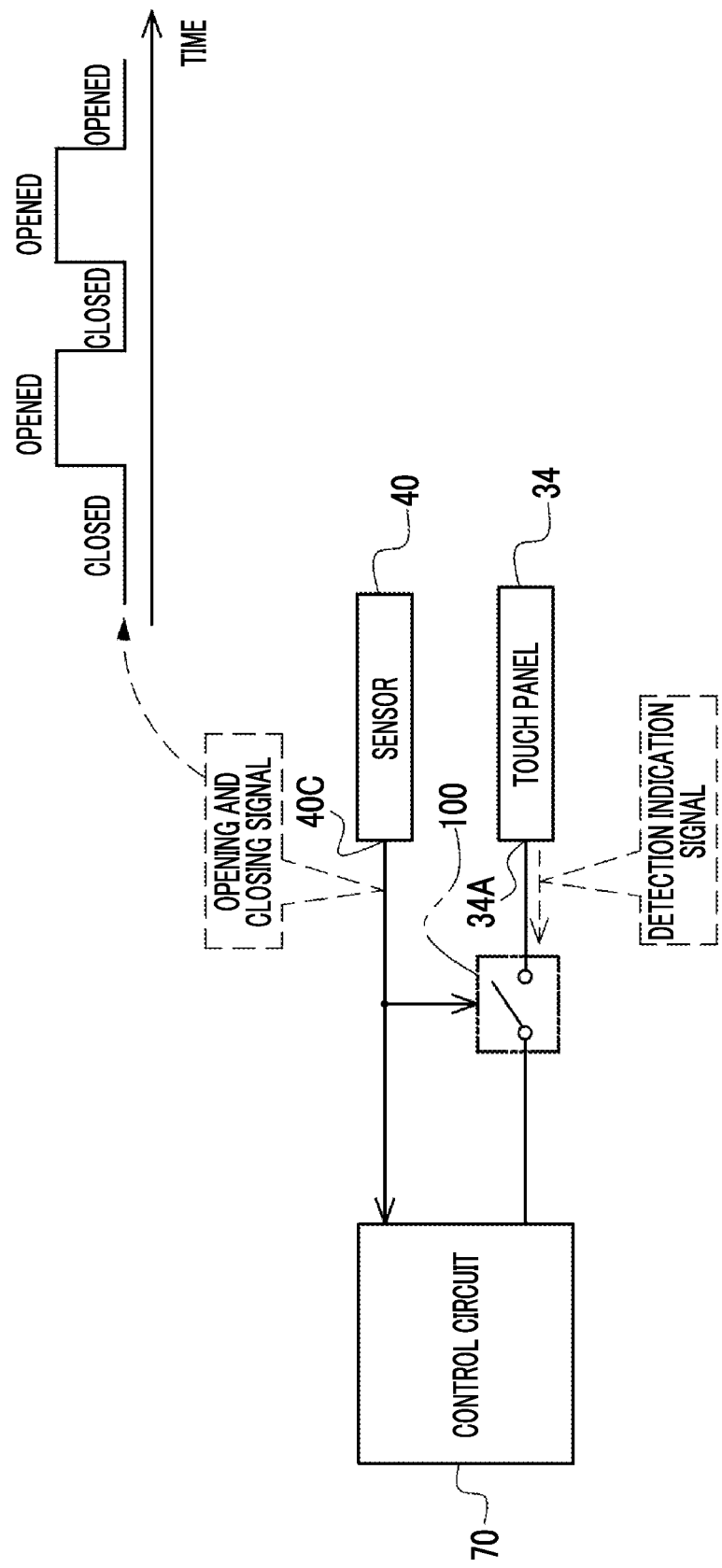
FIG. 19 is a configuration diagram illustrating a modification example of the configuration of the blocking circuit included in the restriction portion of the imaging apparatus according to the embodiment.

While the AND circuit 82A is illustrated in the embodiment, the technology of the present disclosure is not limited thereto. For example, as illustrated in FIG. 19, a switch 100 may be applied instead of the AND circuit 82A. The switch 100 is an example of a "switching element" according to the embodiment of the technology of the present disclosure.

The switch 100 is an element that can switch between a connection state where the output terminal 34A and the control circuit 70 that is an output destination of the detection indicative signal are connected, and a disconnection state where the output terminal 34A and the control circuit 70 are disconnected. The sensor 40 supplies the opening and closing signal to the switch 100. The sensor 40 is an example of a "supply circuit" according to the embodiment of the technology of the present disclosure. In addition, in the example illustrated in FIG. 19, the sensor 40 and the switch 100 are an example of a "blocking circuit" according to the embodiment of the technology of the present disclosure.

In a case where the opening and closing signal supplied from the sensor 40 indicates that the touch panel display unit 26 is positioned within the opened range, the switch 100 is set to the connection state. In a case where the opening and closing signal supplied from the sensor 40 indicates that the touch panel display unit 26 is positioned within the closed range, the switch 100 is set to the disconnection state. That is, by setting the switch 100 to an opened state, the detection indicative signal is output to the control circuit 70 only in a case where the touch panel display unit 26 is positioned within the opened range. In other words, in a case where the closing signal is output from the sensor 40, the switch 100 is set to the disconnection state, and the detection indicative signal from the touch panel 34 is not input into the control circuit 70. By using the switch 100, erroneous detection of the touch panel 34 can be avoided even in a case where the touch panel display unit 26 is quickly closed, in the same manner as the use of the AND circuit 82A described in the embodiment. In addition, since the switch 100 is used, the detection indicative signal can be output to the control circuit 70 only in a case where the touch panel 34 is touched in a state where the touch panel display unit 26 is positioned within the opened range, with a simple configuration compared to a case of using a more complicated element than the switch 100 as an element that outputs the detection indicative signal to the control circuit 70 only in a case where the touch panel 34 is touched in a state where the touch panel display unit 26 is positioned within the opened range.

Furthermore, in the imaging apparatus 10, the flexible substrate 60 is covered with the cover member 50. Thus, according to the present configuration, a contact of an object (for example, the finger of the user) on the flexible substrate 60 can be prevented compared to a case of not using the cover member 50.

In addition, in the embodiment, while an example of a form of an interrupt type in which the TP state specifying signal is supplied to the control circuit 70 by causing the control circuit 70 to output the request signal to the touch panel 34 in a case where the detection indicative signal is input into the control circuit 70 as the interrupt signal is illustratively described, the technology of the present disclosure is not limited thereto. For example, the TP state specifying signal may be periodically supplied to the control circuit 70 from the touch panel 34 as a polling type that does not use the interrupt signal. In this case, as will be described later, the sensitivity of the touch panel 34 may be restricted using a software configuration.

Figure 20:
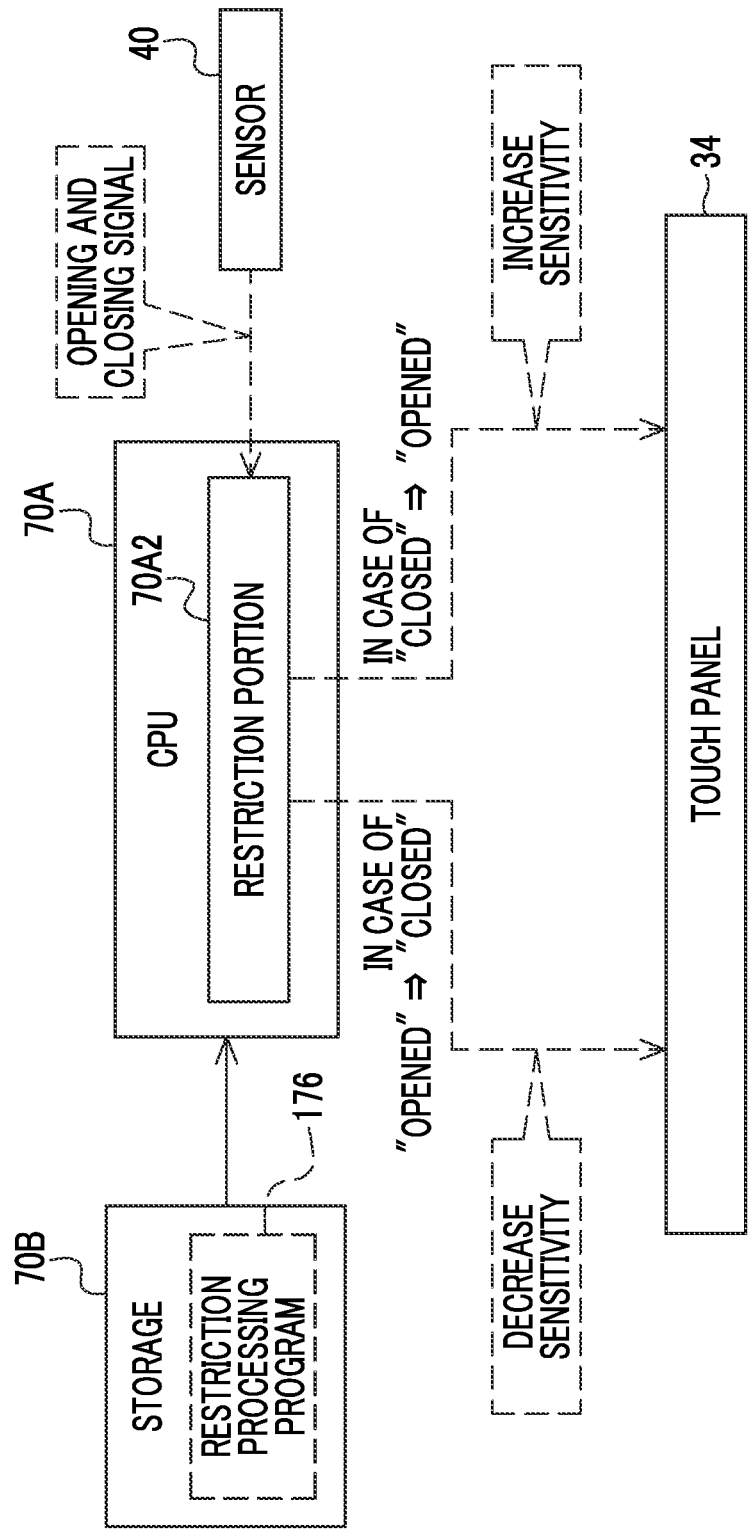
FIG. 20 is a block diagram illustrating an example of a configuration for software implementation of the restriction portion of the imaging apparatus according to the embodiment.

In addition, in the embodiment, while an example of a form of restricting the sensitivity of the touch panel 34 by blocking the output of the detection indicative signal using a hardware configuration formed with the AND circuit 82A is illustratively described, the technology of the present disclosure is not limited thereto. The sensitivity of the touch panel 34 may be restricted using a software configuration. In this case, for example, as illustrated in FIG. 20, the storage 70B stores a restriction processing program 176. The CPU 70A operates as a restriction portion 70A2 by reading out the restriction processing program 176 from the storage 70B and executing the read restriction processing program 176. The restriction portion 70A2 restricts the sensitivity of the touch panel 34 in accordance with the opening and closing signal input from the sensor 40. Specifically, in a case where the touch panel display unit 26 moves from the opened range to the closed range, the restriction portion 70A2 decreases the sensitivity of the touch panel 34 to less than the predetermined sensitivity by controlling operation of the touch panel 34. In addition, in a case where the touch panel display unit

26 moves from the closed range to the opened range, the restriction portion 70A2 increases the sensitivity of the touch panel 34 to greater than or equal to the predetermined sensitivity by controlling the operation of the touch panel 34.

Figure 21:
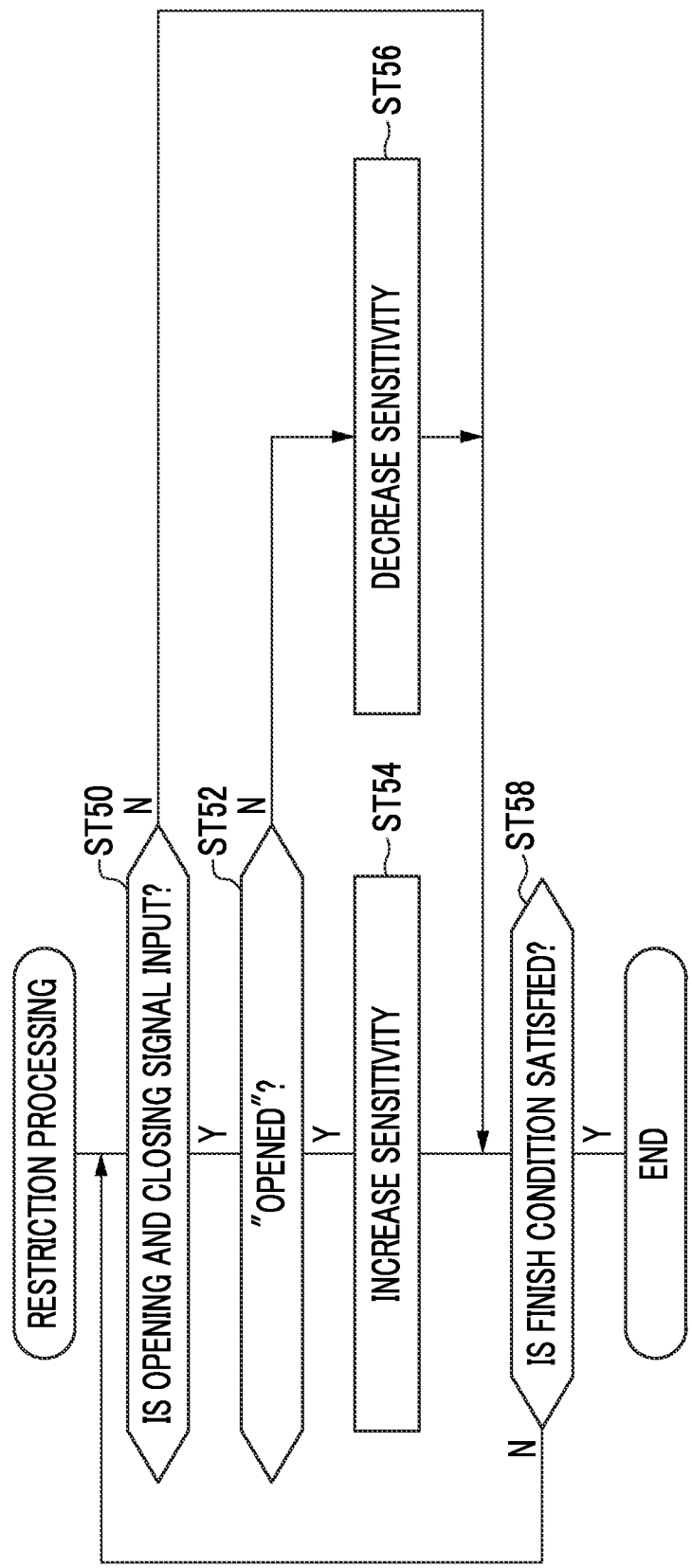
FIG. 21 is a flowchart illustrating an example of a flow of restriction processing according to the embodiment.

FIG. 21 illustrates an example of a flow of restriction processing executed by the CPU 70A in accordance with the restriction processing program 176. In step ST50 illustrated in FIG. 21, the restriction portion 70A2 determines whether or not the opening and closing signal is input from the sensor 40. In step ST50, in a case where the opening and closing signal is not input from the sensor 40, a negative determination is made, and the restriction processing transitions to step ST58. In step ST50, in a case where the opening and closing signal is input from the sensor 40, a positive determination is made, and the restriction processing transitions to step ST52.

In step ST52, the restriction portion 70A2 determines whether or not the touch panel display unit 26 is positioned within the opened range based on the opening and closing signal input from the sensor 40. In step ST52, in a case where the touch panel display unit 26 is positioned within the closed range, a negative determination is made, and the restriction processing transitions to step ST56. In step ST52, in a case where the touch panel display unit 26 is positioned within the opened range, a positive determination is made, and the restriction processing transitions to step ST54.

In step ST54, the restriction portion 70A2 increases the sensitivity of the touch panel 34 to greater than or equal to the predetermined sensitivity by controlling the operation of the touch panel 34. After processing of step ST54 is executed, the restriction processing transitions to step ST58.

In step ST56, the restriction portion 70A2 decreases the sensitivity of the touch panel 34 to less than the predetermined sensitivity by controlling the operation of the touch panel 34. After processing of step ST56 is executed, the restriction processing transitions to step ST58.

In step ST58, the restriction portion 70A2 determines whether or not a condition (hereinafter, referred to as a "restriction processing finish condition") under which the restriction processing is finished is satisfied. A condition that an instruction to finish the restriction processing is received by the reception device 88 (refer to FIG. 14) is exemplified as an example of the restriction processing finish condition. In step ST58, in a case where the restriction processing finish condition is not satisfied, a negative determination is made, and the restriction processing transitions to step ST50. In step ST58, in a case where the restriction processing finish condition is satisfied, a positive determination is made, and the restriction processing is finished.

Figure 22:
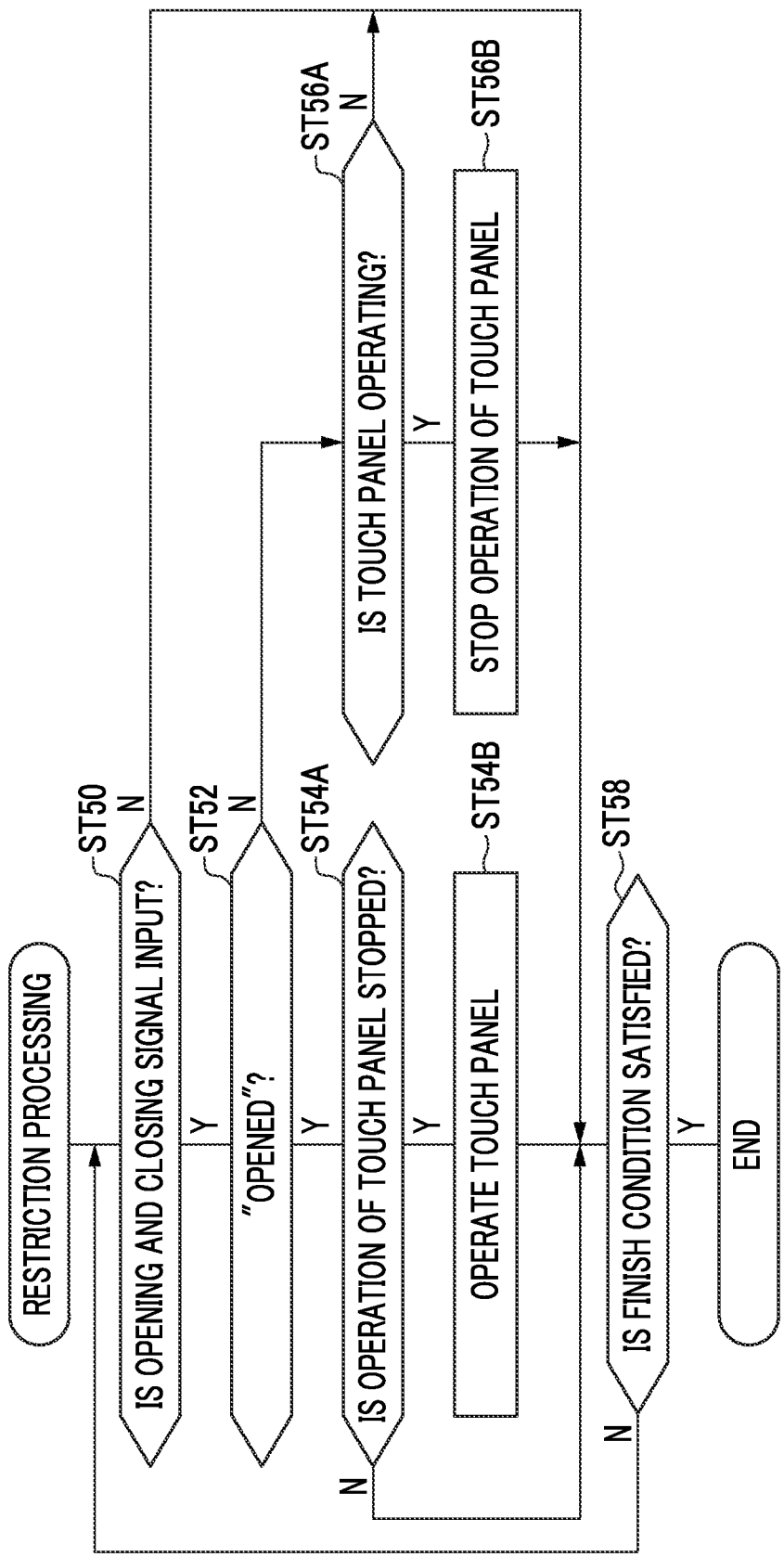
FIG. 22 is a flowchart illustrating a modification example of the flow of restriction processing illustrated in FIG. 21.

FIG. 22 illustrates a modification example of the flow of restriction processing executed by the CPU 70A in accordance with the restriction processing program 176. The restriction processing illustrated in FIG. 22 is different from the restriction processing illustrated in FIG. 21 in that processing of step ST54A and processing of step ST54B are included instead of processing of step ST54. In addition, the restriction processing illustrated in FIG. 22 is different from the restriction processing illustrated in FIG. 21 in that processing of step ST56A and processing of step ST56B are included instead of processing of step ST56.

In step ST54A, the restriction portion 70A2 determines whether or not the operation of the touch panel 34 is stopped. The determination as to whether or not the operation of the touch panel 34 is stopped is performed by determining whether or not the power supply of the touch panel 34 is made OFF. In step ST54A, in a case where the touch panel 34 is operating, a negative determination is made, and the restriction processing transitions to step ST58. In step ST54A, in a case where the operation of the touch panel 34 is stopped, a positive determination is made, and the restriction processing transitions to step ST54B.

In step ST54B, the restriction portion 70A2 operates the touch panel 34 by making the power supply of the touch panel 34 ON. After processing of step ST54B is executed, the restriction processing transitions to step ST58.

In step ST56A, the restriction portion 70A2 determines whether or not the touch panel 34 is operating. The determination as to whether or not the touch panel 34 is operating is performed by determining whether or not the power supply of the touch panel 34 is made ON. In step ST56A, in a case where the operation of the touch panel 34 is stopped, a negative determination is made, and the restriction processing transitions to step ST58. In step ST56A, in a case where the touch panel 34 is operating, a positive determination is made, and the restriction processing transitions to step ST56B.

In step ST56B, the restriction portion 70A2 stops the operation of the touch panel 34 by making the power supply of the touch panel 34 OFF. After processing of step ST56B is executed, the restriction processing transitions to step ST58.

As illustrated in FIG. 20 to FIG. 22, the sensitivity of the touch panel 34 may be restricted by controlling the touch panel 34 using a software configuration, or may be restricted using a hardware configuration such as the AND circuit 82A illustrated in FIG. 15 or the switch 100 illustrated in FIG. 19. While restriction of the sensitivity of the touch panel 34 is described above, "restriction of the sensitivity of the touch panel 34" includes, in addition to a meaning of causing the touch panel 34 to be insensitive to a contact of an object as in the examples illustrated in FIG. 20 to FIG. 22 and a meaning of blocking the output of the detection indicative signal from the touch panel 34 using a hardware configuration such as the AND circuit 82A illustrated in FIG. 15 or the switch 100 illustrated in FIG. 19, a meaning of decreasing a signal level of the TP state specifying signal to an extent that the TP state specifying signal is not detectable by the control circuit 70 and a meaning of invalidating the TP state specifying signal from the touch panel 34 using the control circuit 70.

In addition, while the imaging apparatus 10 is illustrated in the embodiment, the technology of the present disclosure is not limited thereto. The technology of the present disclosure can also be applied to an electronic apparatus (for example, a fixed lens camera, a laptop computer, and/or a wearable terminal apparatus or the like) in which a touch panel is rotationally opened and closed.

Figure 23:
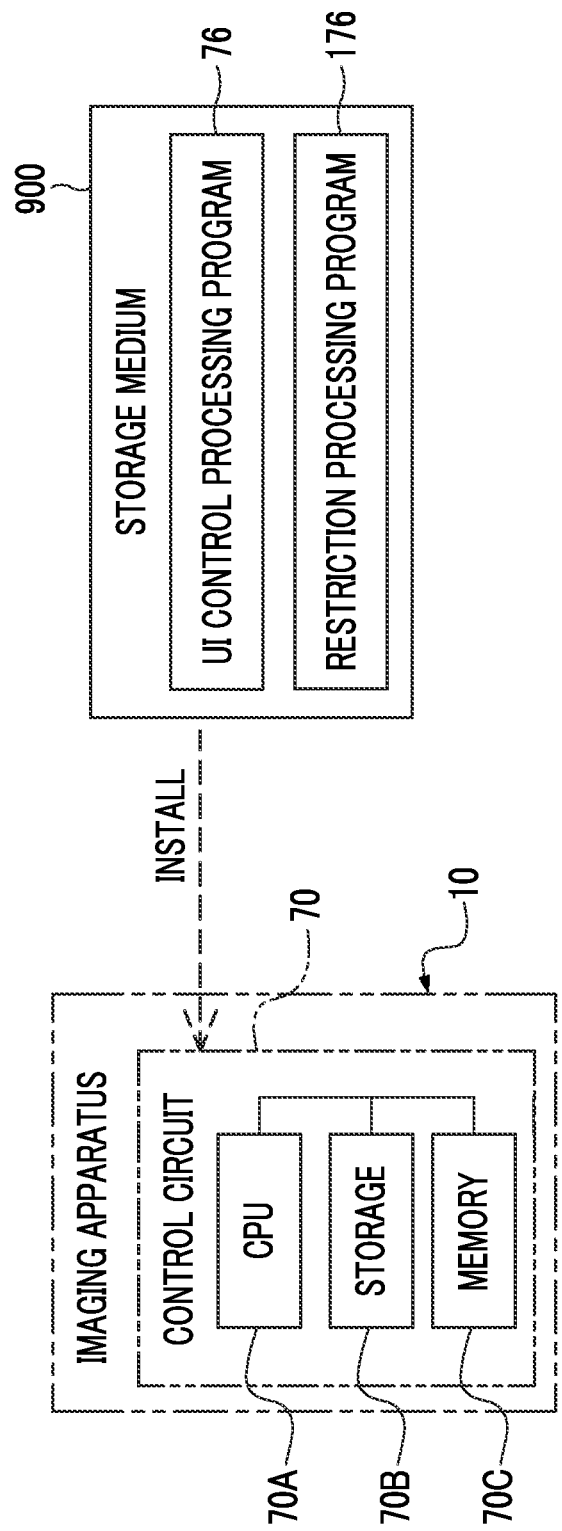
FIG. 23 is a conceptual diagram illustrating an example of an aspect in which a UI control processing program and a restriction processing program according to the embodiment are installed on the imaging apparatus.

In addition, while an example of a form of storing the UI control processing program 76 in the storage 70B is exemplified in the example illustrated in FIG. 16, and an example of a form of storing the restriction processing program 176 in the storage 70B is exemplified in the example illustrated in FIG. 20, the technology of the present disclosure is not limited thereto. For example, as illustrated in FIG. 23, the UI control processing program 76 and the restriction processing program 176 (hereinafter, referred to as the "program" without the reference signs unless otherwise necessary to distinguish therebetween) may be stored in a storage medium 900. Any portable storage medium such as an SSD or a USB memory is exemplified as an example of the storage medium 900. In the example illustrated in FIG. 23, while the UI control processing program 76 and the restriction processing program 176 are stored in the storage medium, the UI control processing program 76 or the restriction processing program 176 may be stored in the storage medium.

The program stored in the storage medium 900 is installed on the control circuit 70. The CPU 70A executes the UI control processing and the restriction processing (hereinafter, referred to as "imaging apparatus processing" unless otherwise necessary to distinguish therebetween) in accordance with the program.

In addition, the program may be stored in a storage portion of another computer, a server apparatus, or the like connected to the control circuit 70 through a communication network (not illustrated), and the program may be downloaded to the control circuit 70 in response to a request from the imaging apparatus 10 and be installed on the control circuit 70.

The entire program does not need to be stored in the storage portion of the other computer, the server apparatus, or the like connected to the control circuit 70 or the storage 70B. A part of the program may be stored in the storage portion of the other computer, the server apparatus, or the like.

In the example illustrated in FIG. 23, the CPU 70A may be a single CPU or include a plurality of CPUs. In addition, a GPU may be applied instead of the CPU 70A.

In the example illustrated in FIG. 23, while the control circuit 70 is illustrated, the technology of the present disclosure is not limited thereto. A device including an ASIC, an FPGA, and/or a PLD may be applied instead of the control circuit 70. In addition, a combination of a hardware configuration and a software configuration may be used instead of the control circuit 70.

Various processors illustrated below can be used as a hardware resource for executing the imaging apparatus processing. For example, a CPU that is a general-purpose processor functioning as the hardware resource for executing the imaging apparatus processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor. A memory is incorporated in or connected to any of the processors, and any of the processors executes the imaging apparatus processing using the memory.

The hardware resource for executing the imaging apparatus processing may be configured with one of those various processors or may be configured with a combination of two or more processors of the same type or different types (for example, a combination of a plurality of FPGAs or a combination of a CPU and an FPGA). In addition, the hardware resource for executing the imaging apparatus processing may be one processor.

As an example of a configuration with one processor, first, a form in which one processor is configured with a combination of one or more CPUs and software, and in which this processor functions as the hardware resource for executing the imaging apparatus processing is available. Second, as represented by an SoC or the like, a form of using a processor that implements, by one IC chip, a function of the entire system including a plurality of hardware resources for executing the imaging apparatus processing is available. In such a manner, the imaging apparatus processing is implemented using one or more of the various processors as the hardware resource.

Furthermore, as a hardware structure of those various processors, more specifically, an electric circuit in which circuit elements such as semiconductor elements are combined can be used. In addition, the imaging apparatus processing is merely an example. Accordingly, unnecessary steps may be deleted, new steps may be added, or a processing order may be rearranged without departing from a gist of the technology of the present disclosure.

Above described contents and illustrated contents are detailed description for parts according to the embodiment of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B. or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendices are further disclosed with respect to the embodiment.

[Appendix 1]

An electronic apparatus including a flexible substrate that connects a touch panel display unit including a touch panel to a control circuit in an electronic apparatus main body, the touch panel being opened and closed with respect to a specific surface of the electronic apparatus main body by rotating in a direction of separating the touch panel from the specific surface and a direction of bringing the touch panel close to the specific surface through a hinge, and a cover member that protects the flexible substrate, in which the flexible substrate extends in the electronic apparatus main body from an edge portion on a side on which the hinge is positioned in an outer peripheral edge portion of the touch panel display unit, through an opening formed on the specific surface, and the cover member is inserted in the electronic apparatus main body from the edge portion side through the opening and covers an exposed location that is exposed to the touch panel display unit side from the opening side of the flexible substrate.

[Appendix 2]

The electronic apparatus according to Appendix 1, in which the hinge is pivotally supported by the electronic apparatus main body to be rotatable in the direction of separating the touch panel from the specific surface and the direction of bringing the touch panel close to the specific surface.

[Appendix 3]

The electronic apparatus according to Appendix 1 or 2, in which the cover member includes a cover member main body that is inserted in the electronic apparatus main body through the opening and covers the exposed location, and a holding portion that is disposed on the side on which the hinge is positioned in the outer peripheral edge portion and holds an attitude of the cover member main body at a position at which the exposed location is covered.

[Appendix 4]

The electronic apparatus according to Appendix 3, in which the holding portion is a cylindrical body that is disposed in a base end portion of the cover member main body and is formed to have a cylindrical shape, and the hinge is rotatably inserted in the cylindrical body.

[Appendix 5]

The electronic apparatus according to Appendix 4, in which the cover member main body is a protrusion that extends in the electronic apparatus main body from an outer peripheral surface of the cylindrical body through the opening.

[Appendix 6]

The electronic apparatus according to Appendix 5, in which a surface of the protrusion on the touch panel display unit side is formed to have a planar shape.

[Appendix 7]

The electronic apparatus according to any one of Appendices 1 to 6, in which the cover member is inserted in the electronic apparatus main body through the opening regardless of whether or not the touch panel display unit is rotated through the hinge.

[Appendix 8]

The electronic apparatus according to any one of Appendices 1 to 7, in which the cover member is inserted in the electronic apparatus main body through the opening regardless of a degree of separation of the touch panel display unit from the specific surface.

[Appendix 9]

The electronic apparatus according to any one of Appendices 1 to 8, in which the electronic apparatus main body is an imaging apparatus main body, the specific surface is a rear surface of the imaging apparatus main body, and the touch panel display unit is pivotally supported by the imaging apparatus main body through the hinge, and the touch panel display unit is opened and closed with respect to the rear surface by rotating the touch panel display unit in a direction of separating the touch panel display unit from the rear surface and a direction of bringing the touch panel display unit close to the rear surface through the hinge.

[Appendix 10]

The electronic apparatus according to Appendix 9, in which the hinge is arranged at a position at which the touch panel display unit is rotatable from the rear surface toward a bottom surface side of the imaging apparatus main body.

[Appendix 11]

An imaging apparatus including a flexible substrate that connects a touch panel display unit including a touch panel to a control circuit in an imaging apparatus main body, the touch panel being opened and closed with respect to a specific surface of the imaging apparatus main body by rotating in a direction of separating the touch panel from the specific surface and a direction of bringing the touch panel close to the specific surface through a hinge, and a cover member that protects the flexible substrate, in which the flexible substrate extends in the imaging apparatus main body from an edge portion on a side on which the hinge is positioned in an outer peripheral edge portion of the touch panel display unit, through an opening formed on the specific surface, and the cover member is inserted in the imaging apparatus main body from the edge portion side through the opening and covers an exposed location that is exposed to the touch panel display unit side from the opening side of the flexible substrate.

[Appendix 12]

The imaging apparatus according to Appendix 11, in which the hinge is pivotally supported by the imaging apparatus main body to be rotatable in the direction of separating the touch panel from the specific surface and the direction of bringing the touch panel close to the specific surface.

[Appendix 13]

The imaging apparatus according to Appendix 11 or 12, in which the cover member includes a cover member main body that is inserted in the imaging apparatus main body through the opening and covers the exposed location, and a holding portion that is disposed on the side on which the hinge is positioned in the outer peripheral edge portion and holds an attitude of the cover member main body at a position at which the exposed location is covered.

[Appendix 14]

The imaging apparatus according to Appendix 13, in which the holding portion is a cylindrical body that is disposed in a base end portion of the cover member main body and is formed to have a cylindrical shape, and the hinge is rotatably inserted in the cylindrical body.

[Appendix 15]

The imaging apparatus according to Appendix 14, in which the cover member main body is a protrusion that extends in the imaging apparatus main body from an outer peripheral surface of the cylindrical body through the opening.

[Appendix 16]

The imaging apparatus according to Appendix 15, in which a surface of the protrusion on the touch panel display unit side is formed to have a planar shape.

[Appendix 17]

The imaging apparatus according to any one of Appendices 11 to 16, in which the cover member is inserted in the imaging apparatus main body through the opening regardless of whether or not the touch panel display unit is rotated through the hinge.

[Appendix 18]

The imaging apparatus according to any one of Appendices 11 to 17, in which the cover member is inserted in the imaging apparatus main body through the opening regardless of a degree of separation of the touch panel display unit from the specific surface.

[Appendix 19]

An electronic apparatus including a touch panel display unit that includes a touch panel of at least one type of a capacitance type or an electromagnetic induction type and is opened and closed with respect to a specific surface of an electronic apparatus main body by rotating in a direction of separating the touch panel from the specific surface and a direction of bringing the touch panel close to the specific surface, and a restriction portion that restricts a sensitivity of the touch panel in a case where the touch panel display unit is positioned within a closed range of from a first position to a second position on a specific surface side of the first position in a rotation range of the touch panel display unit.

[Appendix 20]

The electronic apparatus according to Appendix 19, in which the restriction portion restricts the sensitivity in a case where the touch panel display unit is positioned within the closed range in accordance with an operation of rotating in a direction of closing the touch panel display unit with respect to the specific surface.

[Appendix 21]

The electronic apparatus according to Appendix 20, further including a control portion that performs a control for making at least a power supply of the touch panel in the touch panel display unit OFF after the sensitivity is decreased below a predetermined sensitivity by the restriction portion at the first position in a course of closing of the touch panel display unit with respect to the specific surface in accordance with the operation of rotating in the direction of closing the touch panel display unit with respect to the specific surface.

[Appendix 22]

The electronic apparatus according to any one of Appendices 19 to 21, in which the first position is a position predetermined as a position at which the touch panel performs erroneous detection due to electrical characteristics of a component of the electronic apparatus main body.

[Appendix 23]

The electronic apparatus according to any one of Appendices 1 to 22, further including a sensor that contactlessly detects positioning of the touch panel display unit within the closed range, in which the restriction portion restricts the sensitivity in a case where positioning of the touch panel display unit within the closed range is detected by the sensor.

[Appendix 24]

The electronic apparatus according to Appendix 23, in which the sensor includes a magnet and a hall element, one of the hall element and the magnet is disposed in the touch panel display unit, and the other is disposed in the electronic apparatus main body, and in a case where the touch panel display unit is positioned within the closed range, the hall element detects a magnetic field of the magnet with a predetermined intensity or more.

[Appendix 25]

The electronic apparatus according to any one of Appendices 19 to 24, in which the specific surface is a rear surface of the electronic apparatus main body, and the touch panel display unit is pivotally supported by the electronic apparatus main body through a hinge, and the touch panel is opened and closed with respect to the rear surface by rotating in a direction of separating the touch panel from the rear surface and a direction of bringing the touch panel close to the rear surface through the hinge.

[Appendix 26]

The electronic apparatus according to Appendix 25, in which the hinge is arranged at a position at which the touch panel display unit is rotatable from one of the rear surface side and a bottom surface side of the electronic apparatus main body toward the other.

[Appendix 27]

The electronic apparatus according to any one of Appendices 19 to 26, in which the restriction portion includes a blocking circuit that blocks output of a detection indicative signal indicating that detection is performed by the touch panel, and restricts the sensitivity by causing the blocking circuit to block the output in a case where the touch panel display unit is positioned within the closed range.

[Appendix 28]

The electronic apparatus according to Appendix 27, in which the blocking circuit includes a logic circuit that outputs the detection indicative signal only in a case where the touch panel display unit is positioned within an opened range which is a region separated from the specific surface further than the first position in the rotation range.

[Appendix 29]

The electronic apparatus according to Appendix 28, in which the logic circuit includes a first input terminal into which a detection indication signal indicating whether or not detection is performed by the touch panel is input, and a second input terminal into which an opening and closing signal indicating in which of the closed range and the opened range the touch panel display unit is positioned is input, and outputs a logical product of the detection indication signal input into the first input terminal and the opening and closing signal input into the second input terminal.

[Appendix 30]

The electronic apparatus according to Appendix 27, in which the touch panel includes an output terminal from which the detection indicative signal is output to an output destination, the blocking circuit includes a switching element capable of switching between a connection state where the output terminal and the output destination of the detection indicative signal are connected, and a disconnection state where the output terminal and the output destination are disconnected, and a supply circuit that supplies an opening and closing signal indicating in which of an opened range which is a range separated from the specific surface further than the first position in the rotation range, and the closed range the touch panel display unit is positioned to the switching element, and the switching element is set to the connection state in a case where the opening and closing signal supplied from the supply circuit indicates that the touch panel display unit is positioned within the opened range, and is set to the disconnection state in a case where the opening and closing signal supplied from the supply circuit indicates that the touch panel display unit is positioned within the closed range.

[Appendix 31]

A program for a computer applied to an electronic apparatus including a touch panel display unit that includes a touch panel of at least one type of a capacitance type or an electromagnetic induction type and is opened and closed with respect to a specific surface of an electronic apparatus main body by rotating in a direction of separating the touch panel from the specific surface and a direction of bringing the touch panel close to the specific surface, the program causing the computer to execute a process including restricting a sensitivity of the touch panel in a case where the touch panel display unit is positioned within a closed range of from a first position to a second position on a specific surface side of the first position in a rotation range of the touch panel display unit.

[Appendix 32]

A program for a computer applied to an imaging apparatus including a touch panel display unit that includes a touch panel of at least one type of a capacitance type or an electromagnetic induction type and is opened and closed with respect to a specific surface of an imaging apparatus main body by rotating in a direction of separating the touch panel from the specific surface and a direction of bringing the touch panel close to the specific surface, the program causing the computer to execute a process including restricting a sensitivity of the touch panel in a case where the touch panel display unit is positioned within a closed range of from a first position to a second position on a specific surface side of the first position in a rotation range of the touch panel display unit.

[Appendix 33]

An electronic apparatus including a touch panel display unit that includes a touch panel of at least one type of a capacitance type or an electromagnetic induction type and is opened and closed with respect to a specific surface of an electronic apparatus main body by rotating in a direction of separating the touch panel from the specific surface and a direction of bringing the touch panel close to the specific surface, and a processor configured to restrict a sensitivity of the touch panel in a case where the touch panel display unit is positioned within a closed range of from a first position to a second position on a specific surface side of the first position in a rotation range of the touch panel display unit.

[Appendix 34]

An imaging apparatus including a touch panel display unit that includes a touch panel of at least one type of a capacitance type or an electromagnetic induction type and is opened and closed with respect to a specific surface of an imaging apparatus main body by rotating in a direction of separating the touch panel from the specific surface and a direction of bringing the touch panel close to the specific surface, and a processor configured to restrict a sensitivity of the touch panel in a case where the touch panel display unit is positioned within a closed range of from a first position to a second position on a specific surface side of the first position in a rotation range of the touch panel display unit.

EXPLANATION OF REFERENCES

10: imaging apparatus
12: imaging apparatus main body
12A: rear surface
12A1: flat portion
12A2: recess portion
12A2b: bottom surface
12A2b1: opening
12A2a: inner wall
14: interchangeable lens
16: hybrid finder
17: UI system device
20: release button
22: dial
25: hard key portion
26: touch panel display unit
26A: hinge side edge portion
28: touch panel display
29: instruction key
30: housing
31: finder eyepiece portion
32: display
34: touch panel
34A: output terminal
40: sensor
40A: magnet
40B: hall element
40C, 82A3: output terminal
42: hinge
42A: outer peripheral surface
44: imaging element
44A: light receiving surface
50: cover member
52: cover member main body
54: holding portion
54A: outer peripheral surface
60: flexible substrate
60A: exposed location
70: control circuit
70A: CPU
70A1: control portion
70A2, 80: restriction portion
70B: storage
70C: memory
72: connector
73: component
75: input-output interface
76: UI control processing program
79: control circuit
82: blocking circuit
82A: AND circuit
82A1: first input terminal
82A2: second input terminal
88: reception device
85: bus
90: communication line
92: communication circuit
100: switch
176: restriction processing program
900: storage medium
α: distance
A1, A2: direction
A2, B: arrow
R: rotation range
R1: closed range
R2: opened range

What is claimed is:

1. An electronic apparatus comprising:
a touch panel display unit that includes a touch panel of at least one type of a capacitance type or an electromagnetic induction type and is opened and closed with respect to a specific surface of an electronic apparatus main body by rotating in a direction of separating the touch panel from the specific surface and a direction of bringing the touch panel close to the specific surface;
a restriction circuit that decreases a sensitivity of the touch panel in a range on a specific surface side with respect to a first position to less than the sensitivity of the touch panel in a range on a side opposite to the specific surface with respect to the first position, in a rotation range of the touch panel display unit, the first position being between a fully open state and a closed state of the touch panel display unit;
a processor; and
a sensor that contactlessly detects positioning of the touch panel display unit,
the sensitivity of the touch panel in the range on the side opposite to the specific surface with respect to the first position is the sensitivity that a contact of an object on the touch panel can be detected,
the restriction circuit restricts the sensitivity in a case where the sensor detects that the touch panel display unit is positioned in the range on the specific surface side with respect to the first position,
the sensor includes a magnet and a hall element,
one of the hall element and the magnet is disposed in the touch panel display unit, and the other is disposed in the electronic apparatus main body, and
in a case where the touch panel display unit is positioned in the range on the specific surface side with respect to the first position, the hall element detects a magnetic field of the magnet with a predetermined intensity or more.

2. The electronic apparatus according to claim 1, wherein the restriction circuit decreases the sensitivity to less than a predetermined sensitivity in a case where the touch panel display unit is positioned at the first position in accordance with an operation of rotating in a direction of closing the touch panel display unit with respect to the specific surface.

3. The electronic apparatus according to claim 2, wherein
the processor performs a control for making at least a power supply of the touch panel in the touch panel display unit OFF after the sensitivity is decreased below a predetermined sensitivity by the restriction circuit at the first position in a course of closing of the touch panel display unit with respect to the specific surface.

4. The electronic apparatus according to claim 2,
wherein the first position is a position predetermined as a position at which the touch panel performs erroneous detection due to electrical characteristics of a component of the electronic apparatus main body.

5. The electronic apparatus according to claim 2,
wherein the specific surface is a rear surface of the electronic apparatus main body, and
the touch panel display unit is pivotally supported by the electronic apparatus main body through a hinge, and the touch panel is opened and closed with respect to the rear surface by rotating in a direction of separating the touch panel from the rear surface and a direction of bringing the touch panel close to the rear surface through the hinge.

6. The electronic apparatus according to claim 1, wherein
the processor performs a control for making at least a power supply of the touch panel in the touch panel display unit OFF after the sensitivity is decreased below a predetermined sensitivity by the restriction circuit at the first position in a course of closing of the touch panel display unit with respect to the specific surface.

7. The electronic apparatus according to claim 1,
wherein the first position is a position predetermined as a position at which the touch panel performs erroneous detection due to electrical characteristics of a component of the electronic apparatus main body.

8. The electronic apparatus according to claim 1,
wherein the specific surface is a rear surface of the electronic apparatus main body, and
the touch panel display unit is pivotally supported by the electronic apparatus main body through a hinge, and the touch panel is opened and closed with respect to the rear surface by rotating in a direction of separating the touch panel from the rear surface and a direction of bringing the touch panel close to the rear surface through the hinge.

9. The electronic apparatus according to claim 8,
wherein the hinge is arranged at a position at which the touch panel display unit is rotatable from one of the rear surface and a bottom surface side of the electronic apparatus main body toward the other.

10. The electronic apparatus according to claim 1, wherein
the processor controls the touch panel based on a detection indicative signal indicating that detection is performed by the touch panel, and
the detection indicative signal is input to the processor via the restriction circuit.

11. The electronic apparatus according to claim 1
wherein the restriction circuit includes a blocking circuit that blocks output of a detection indicative signal indicating that detection is performed by the touch panel, and restricts the sensitivity by causing the blocking circuit to block the output in a case where the touch panel display unit is positioned in the range on the specific surface side with respect to the first position.

12. The electronic apparatus according to claim 11,
wherein the blocking circuit includes a logic circuit that outputs the detection indicative signal in a case where the touch panel display unit is positioned in the range on the side opposite to the specific surface with respect to the first position in the rotation range.

13. The electronic apparatus according to claim 12,
wherein the logic circuit includes
a first input terminal into which a detection indication signal indicating whether or not detection is performed by the touch panel is input, and
a second input terminal into which an opening and closing signal indicating in which of the range on the specific surface side with respect to the first position or the range on the side opposite to the specific surface with respect to the first position the touch panel display unit is positioned is input, and
outputs a logical product of the detection indication signal input into the first input terminal and the opening and closing signal input into the second input terminal.

14. The electronic apparatus according to claim 11,
wherein the touch panel includes an output terminal from which the detection indicative signal is output to an output destination,
the blocking circuit includes
a switching element capable of switching between a connection state where the output terminal and the output destination are connected, and a disconnection state where the output terminal and the output destination are disconnected, and
a supply circuit that supplies an opening and closing signal to the switching element, the opening and closing signal indicating in which the range on the side opposite to the specific surface with respect to the first position or the range on the specific surface side with respect to the first position the touch panel display unit is positioned, and
the switching element is set to the connection state in a case where the opening and closing signal supplied from the supply circuit indicates that the touch panel display unit is positioned in the range on the side opposite to the specific surface with respect to the first position, and is set to the disconnection state in a case where the opening and closing signal supplied from the supply circuit indicates that the touch panel display unit is positioned in the range on the specific surface side with respect to the first position.

15. The electronic apparatus according to claim 1,
wherein the restriction circuit restricts the sensitivity of the touch panel by decreasing a signal level of a state specifying signal indicating whether or not there is a touch input on the touch panel.

16. The electronic apparatus according to claim 1, wherein
the first position is a position at which the touch panel does not cause erroneous detection due to an action with the specific surface, and
the range on the specific surface side with respect to the first position is the range in which fingers of then a user can be brought into contact with the touch panel.

17. An operation method of an electronic apparatus including a touch panel display unit that includes a touch panel of at least one type of a capacitance type or an electromagnetic induction type and is opened and closed with respect to a specific surface of an electronic apparatus main body by rotating in a direction of separating the touch panel from the specific surface and a direction of bringing the touch panel close to the specific surface, and a sensor that contactlessly detects positioning of the touch panel display unit, the operation method comprising:

decreasing, by way of a restriction circuit, a sensitivity of the touch panel in a case where the touch panel display unit is positioned in a range on a specific surface side with respect to a first position to less than the sensitivity of the touch panel in a range on a side opposite to the specific surface with respect to the first position, in a rotation range of the touch panel display unit, the first position being between a fully open state and a closed state of the touch panel display unit, the sensitivity of the touch panel in the range on the side opposite to the specific surface with respect to the first position is the sensitivity that a contact of an object on the touch panel can be detected, the restriction circuit restricts the sensitivity in a case where the sensor detects that the touch panel display unit is positioned in the range on the specific surface side with respect to the first position, the sensor includes a magnet and a hall element, one of the hall element and the magnet is disposed in the touch panel display unit, and the other is disposed in the electronic apparatus main body, and in a case where the touch panel display unit is positioned in the range on the specific surface side with respect to the first position, the hall element detects a magnetic field of the magnet with a predetermined intensity or more.

* * * * *